Jan. 16, 1923.
I. ENGSTROM.
1,442,059.
COMBINED ADDING, LISTING, AND CHECK WRITING MACHINE.
ORIGINAL FILED DEC. 4, 1916.
14 SHEETS—SHEET 4.
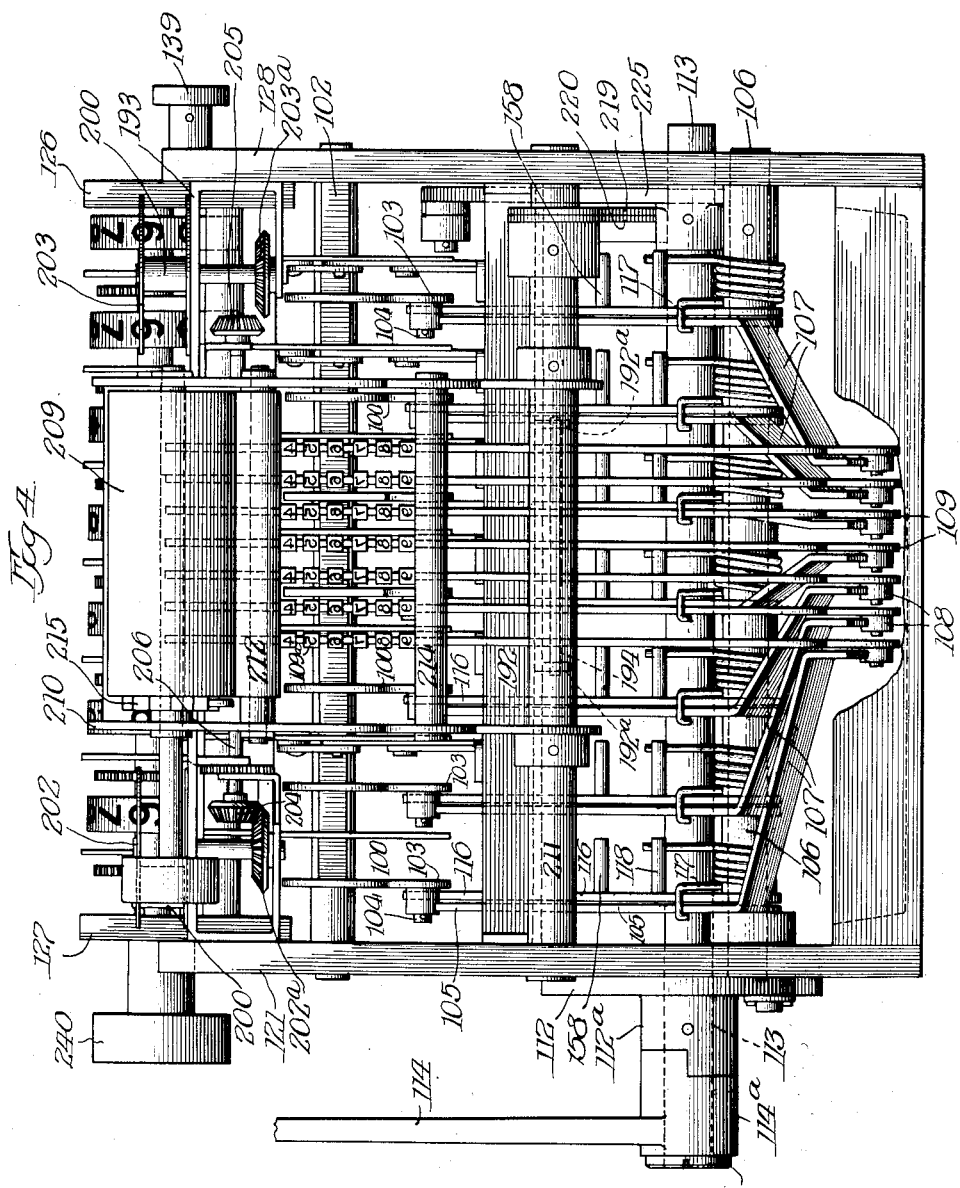

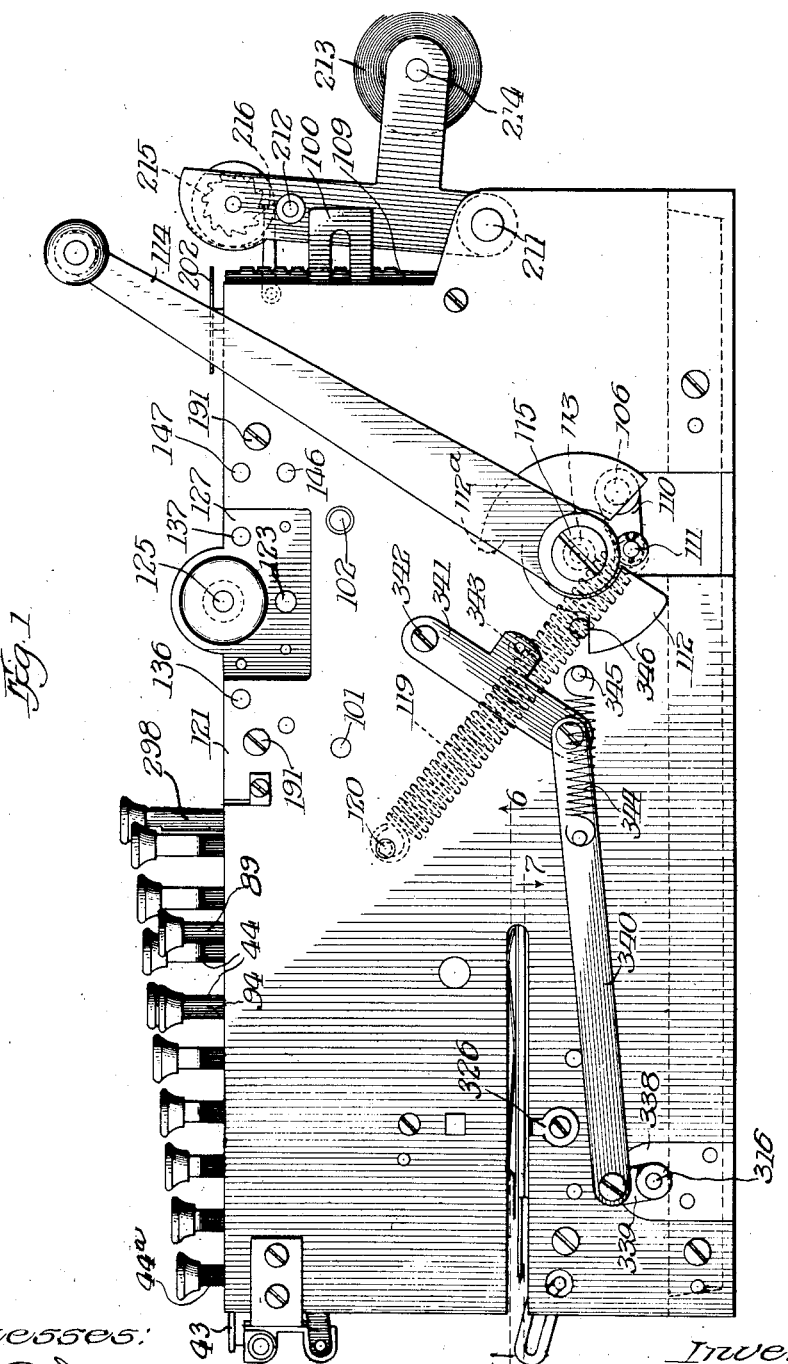

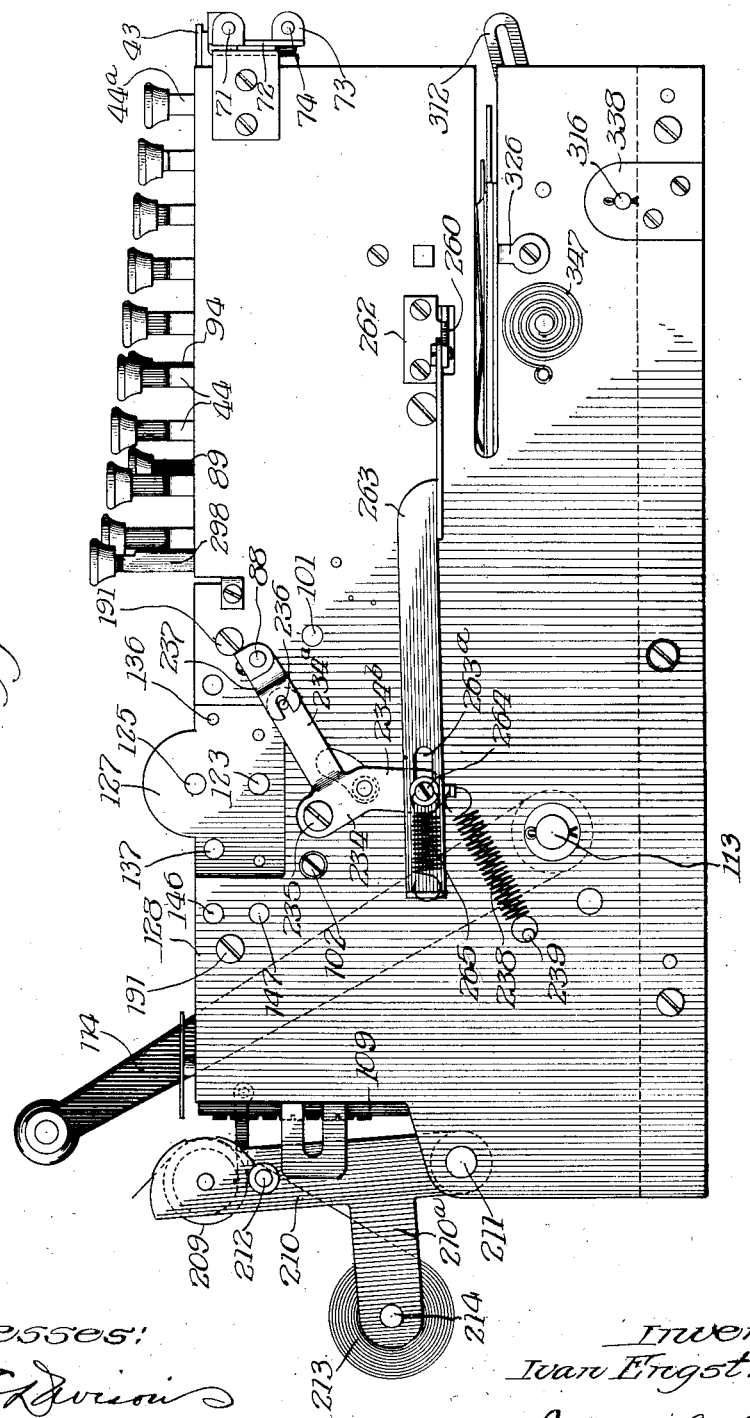

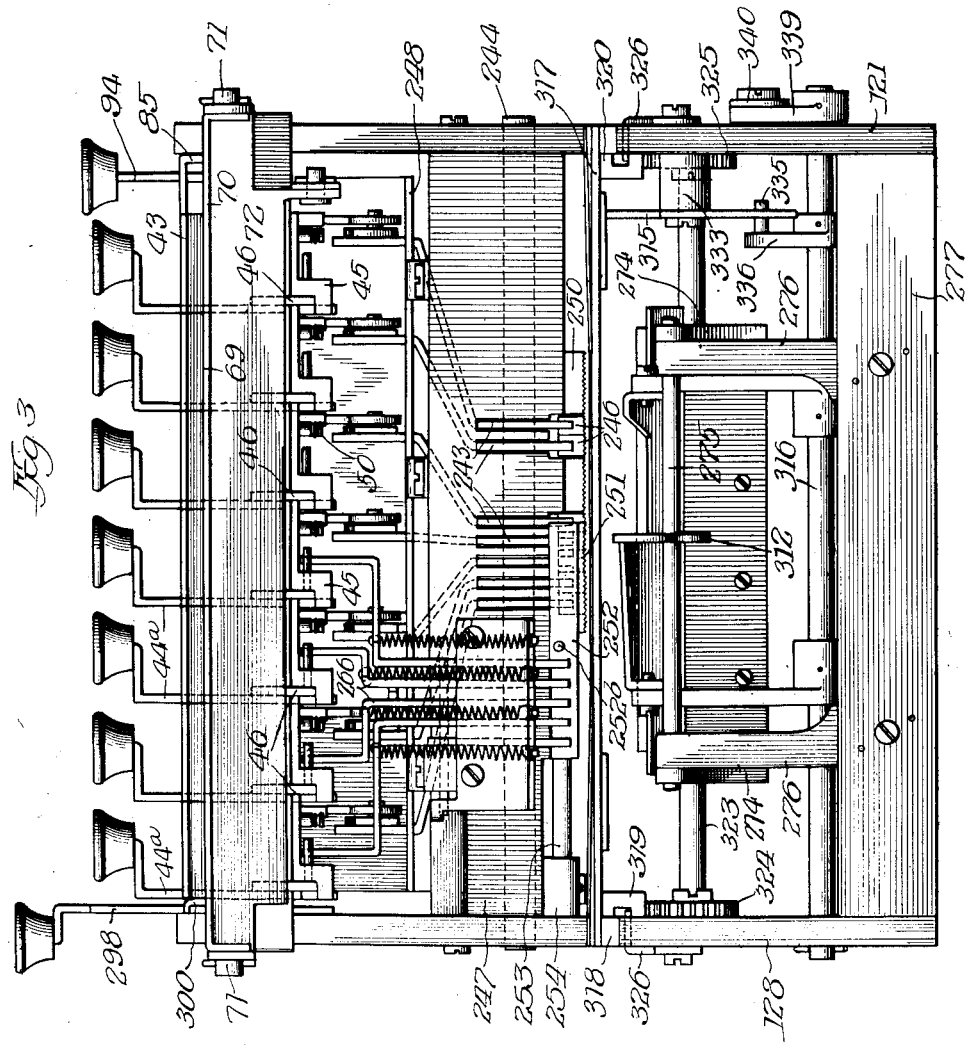

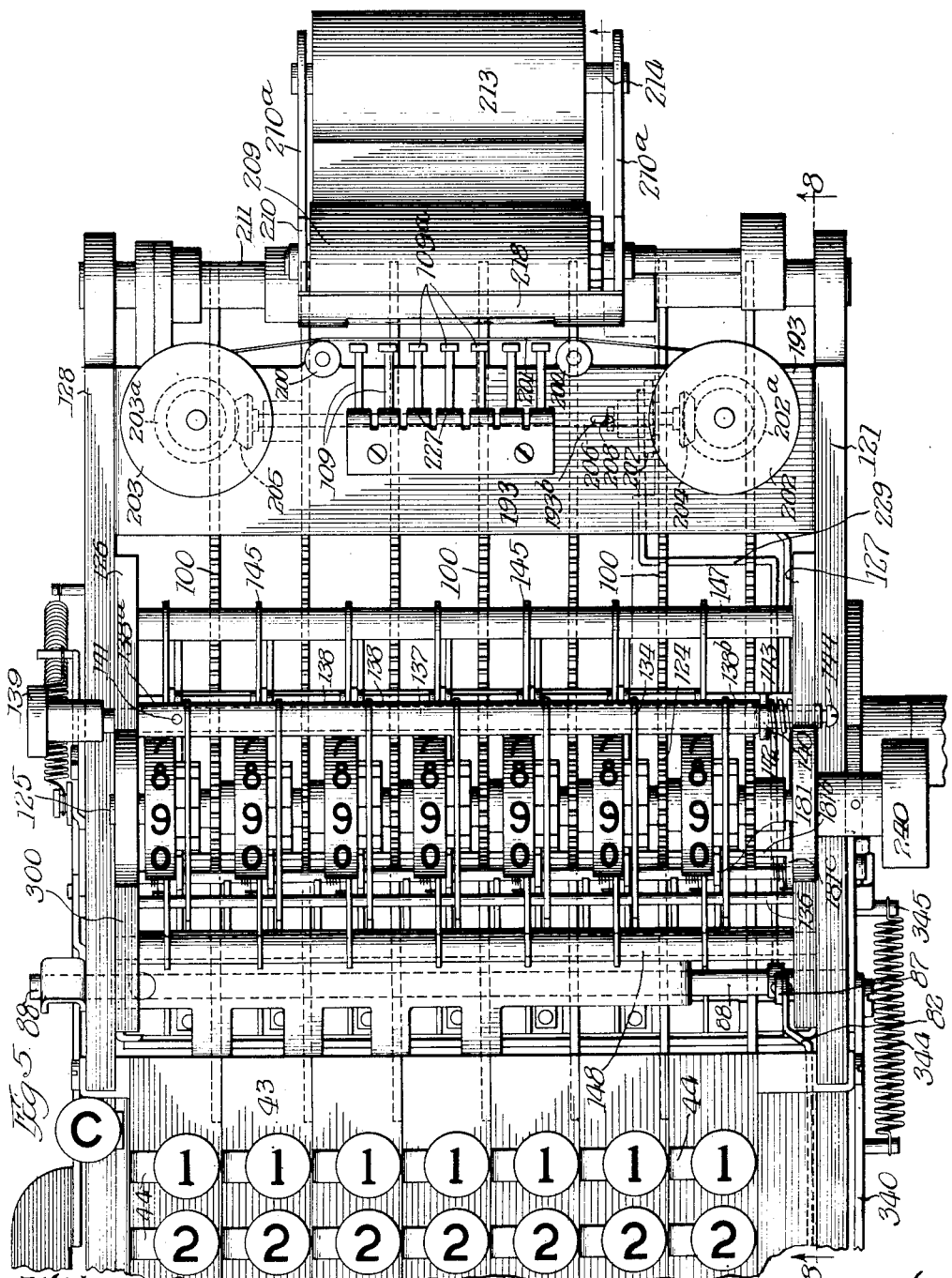

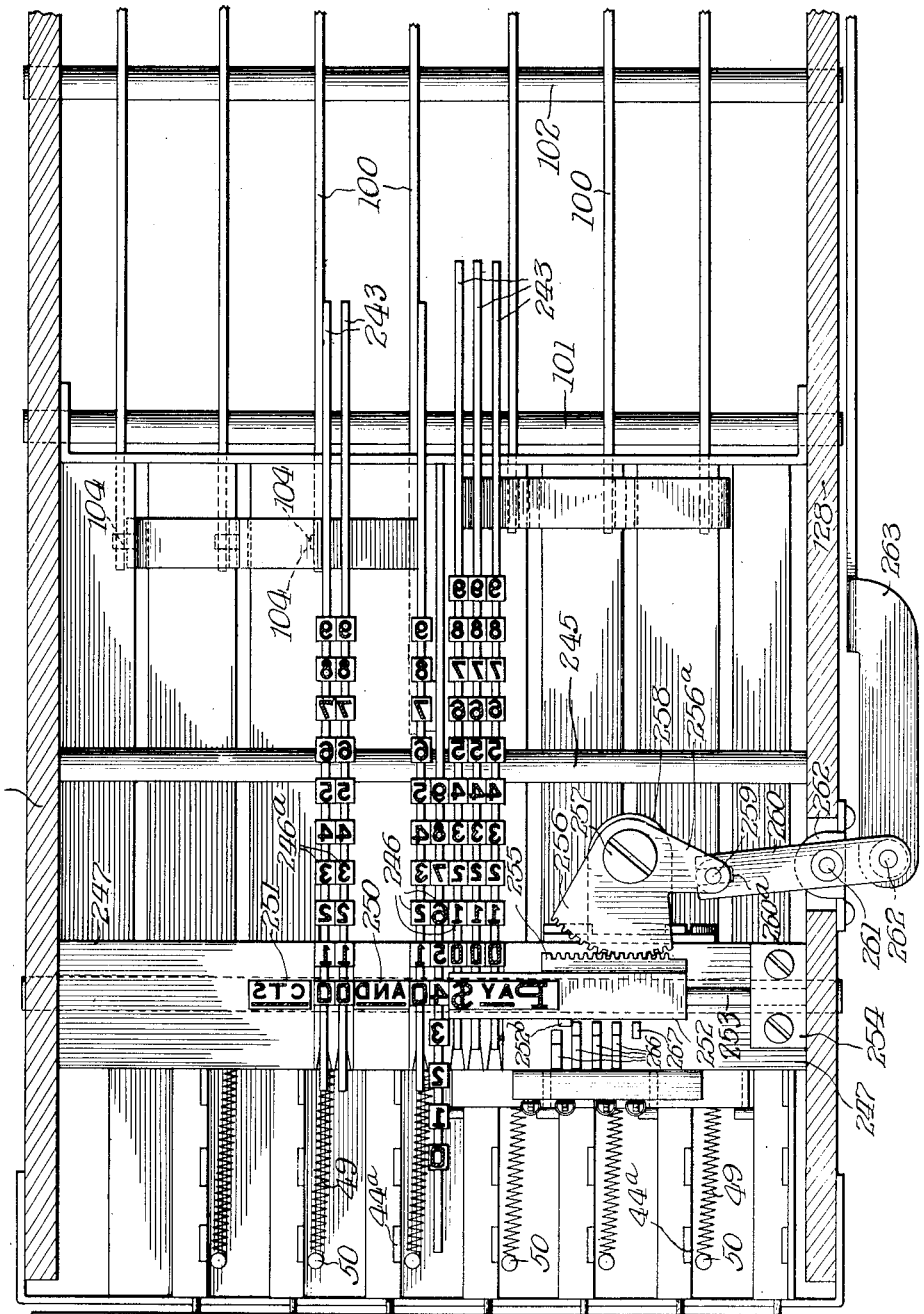

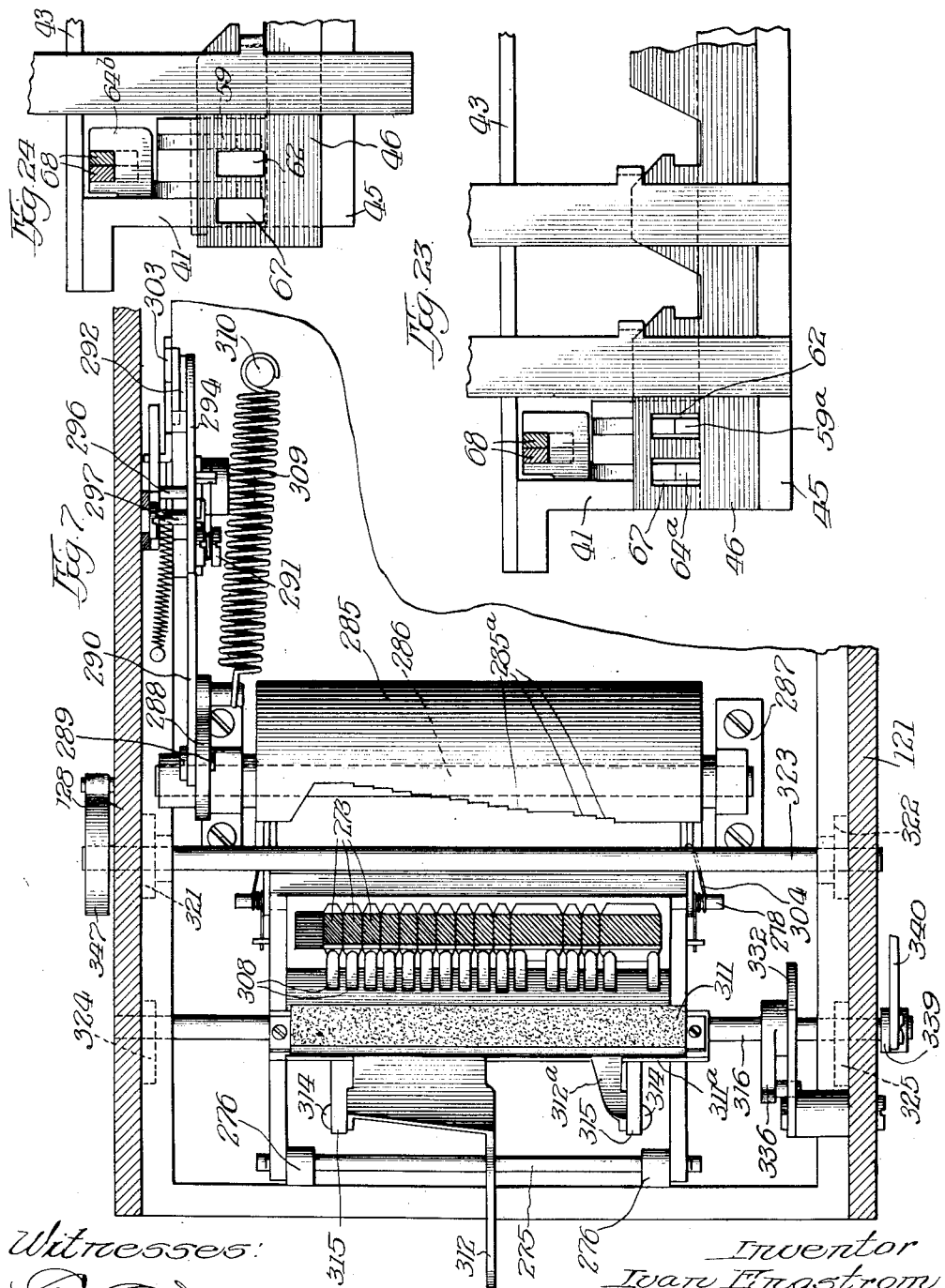

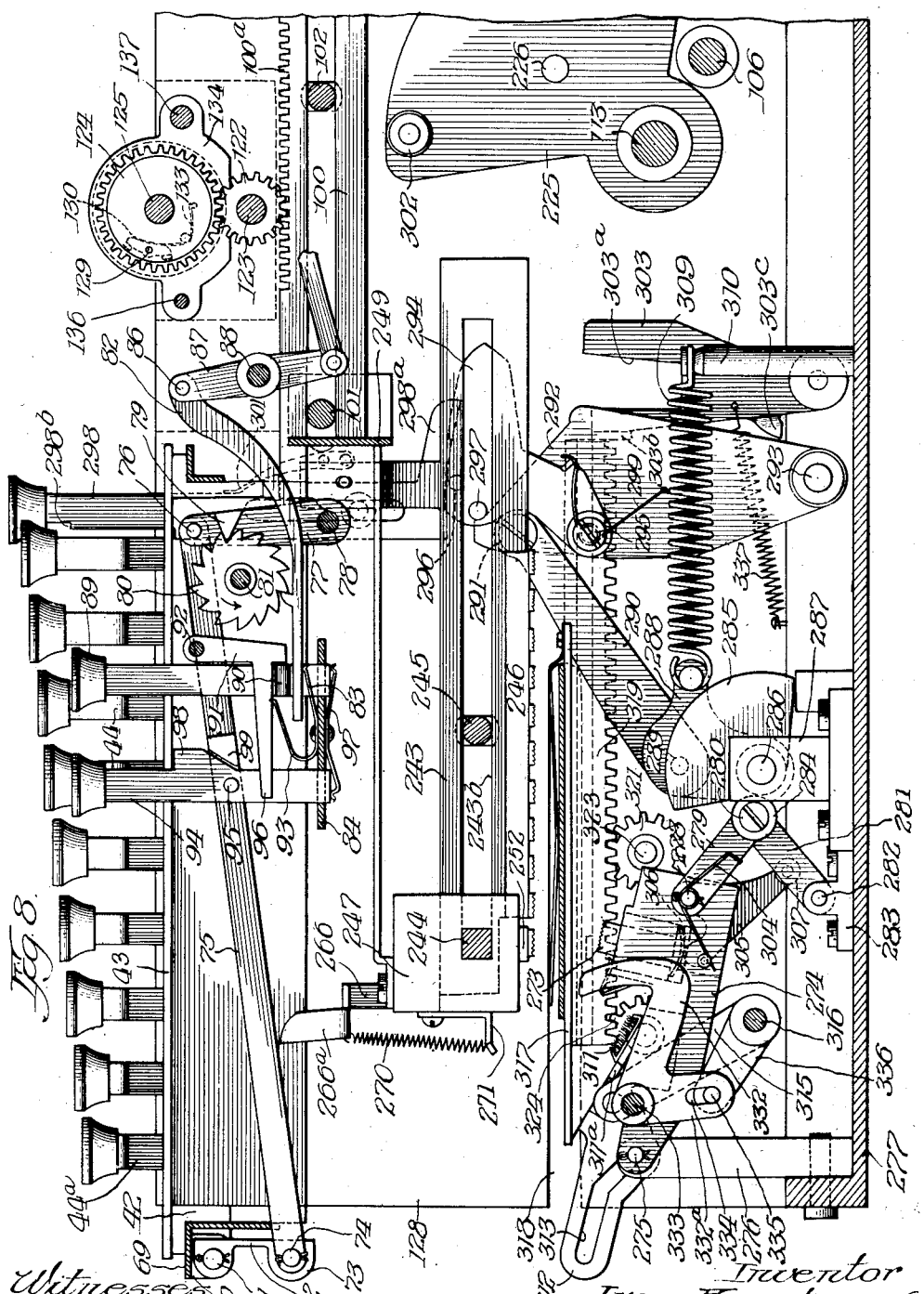

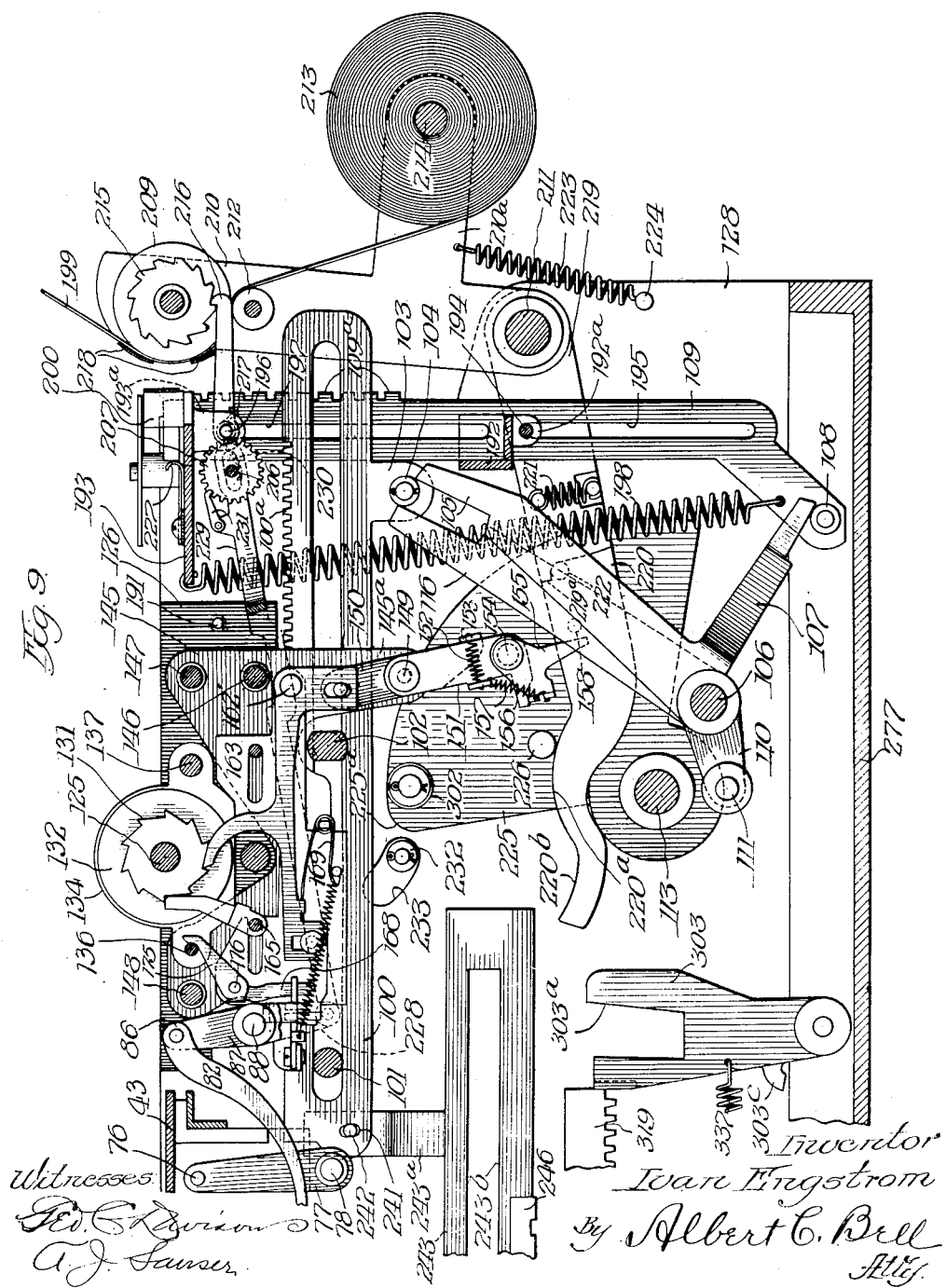

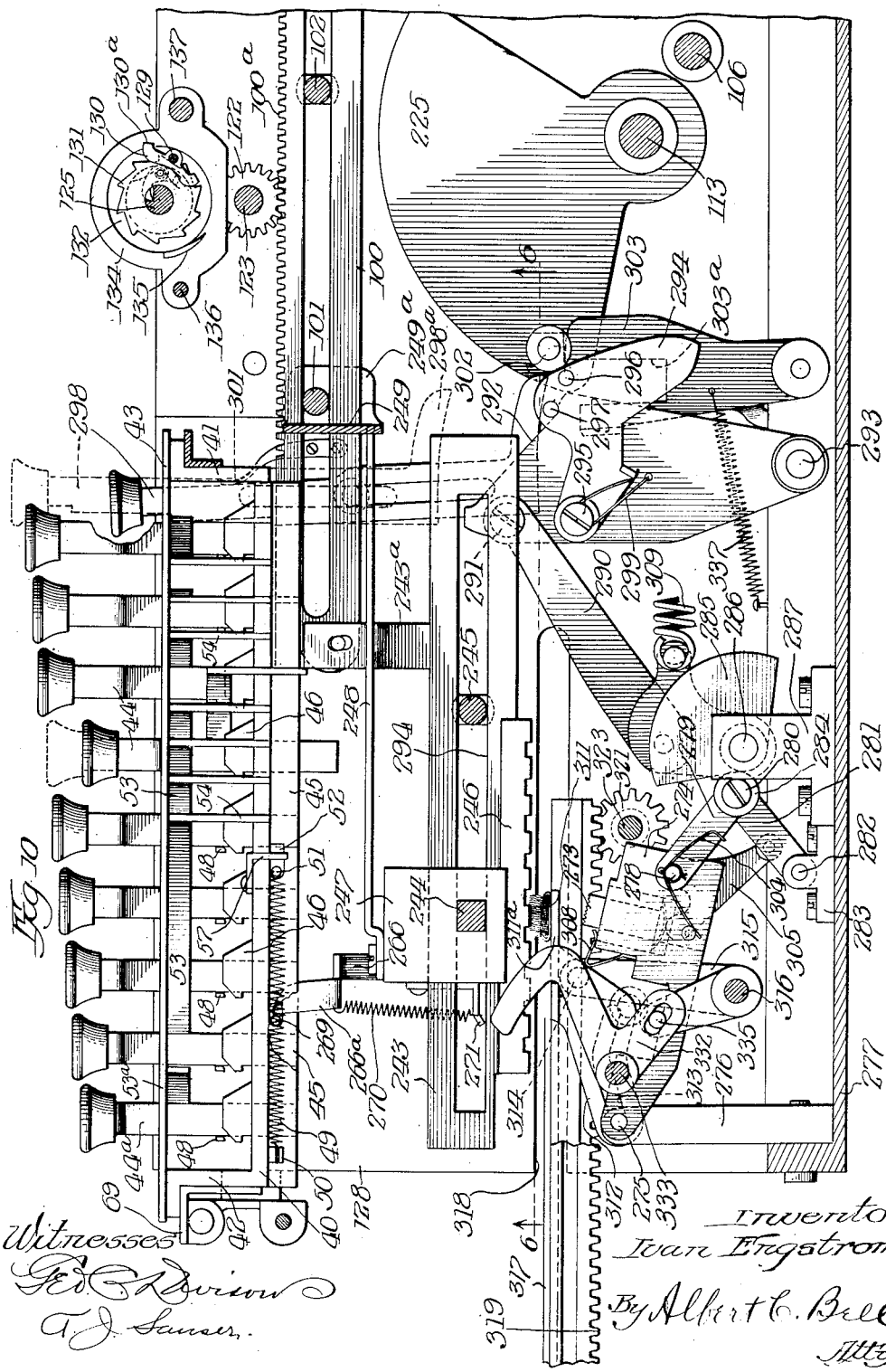

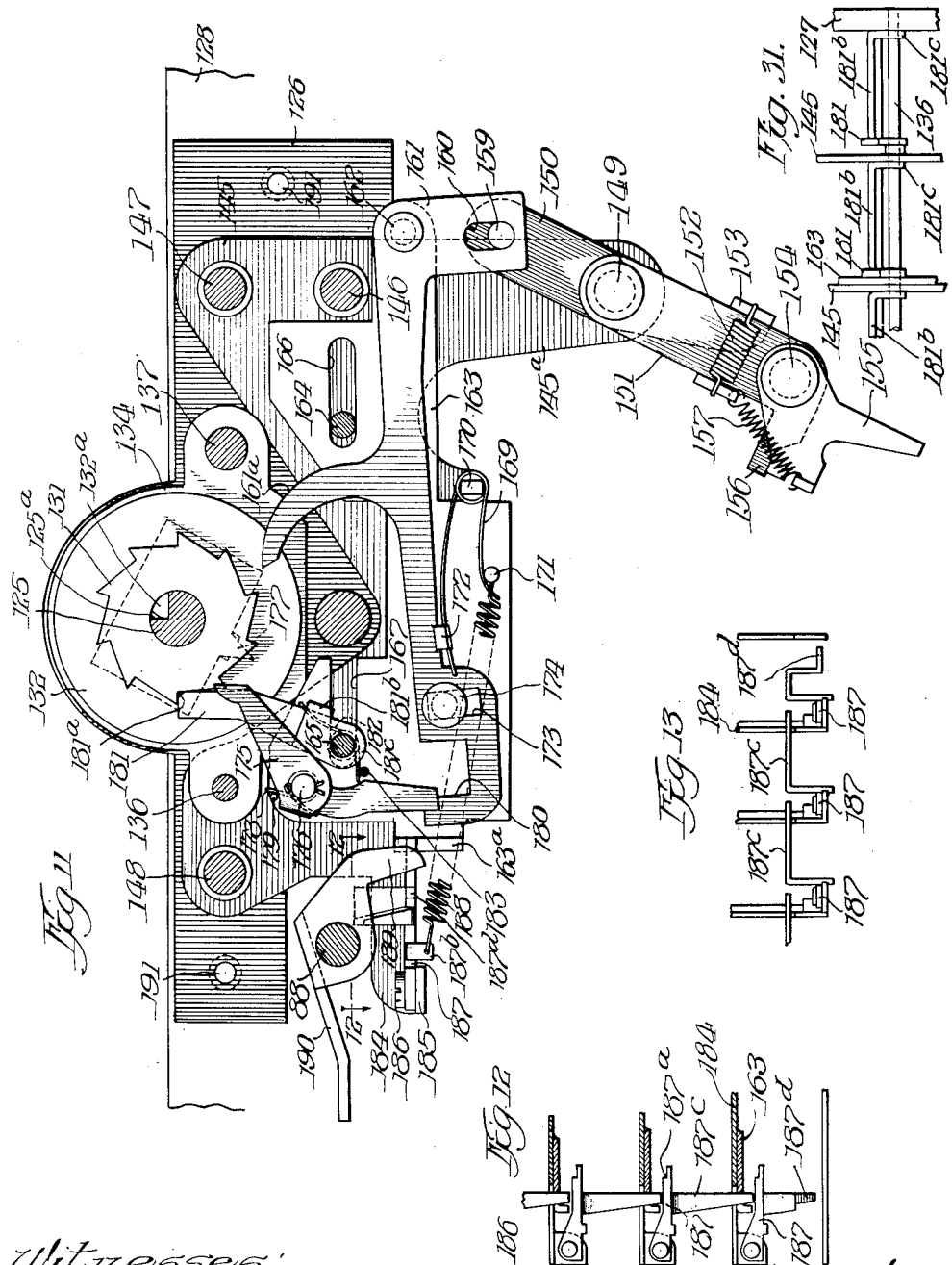

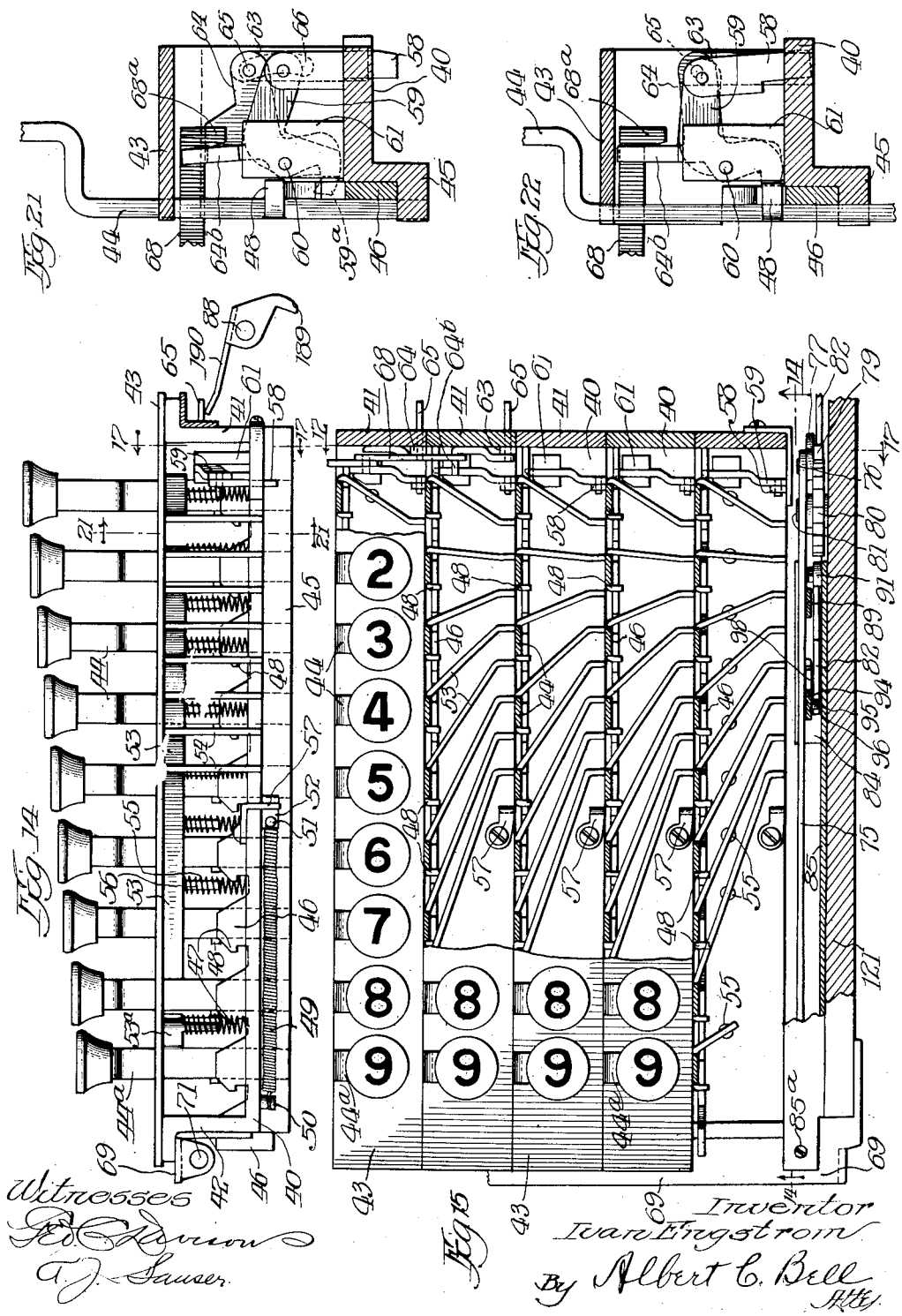

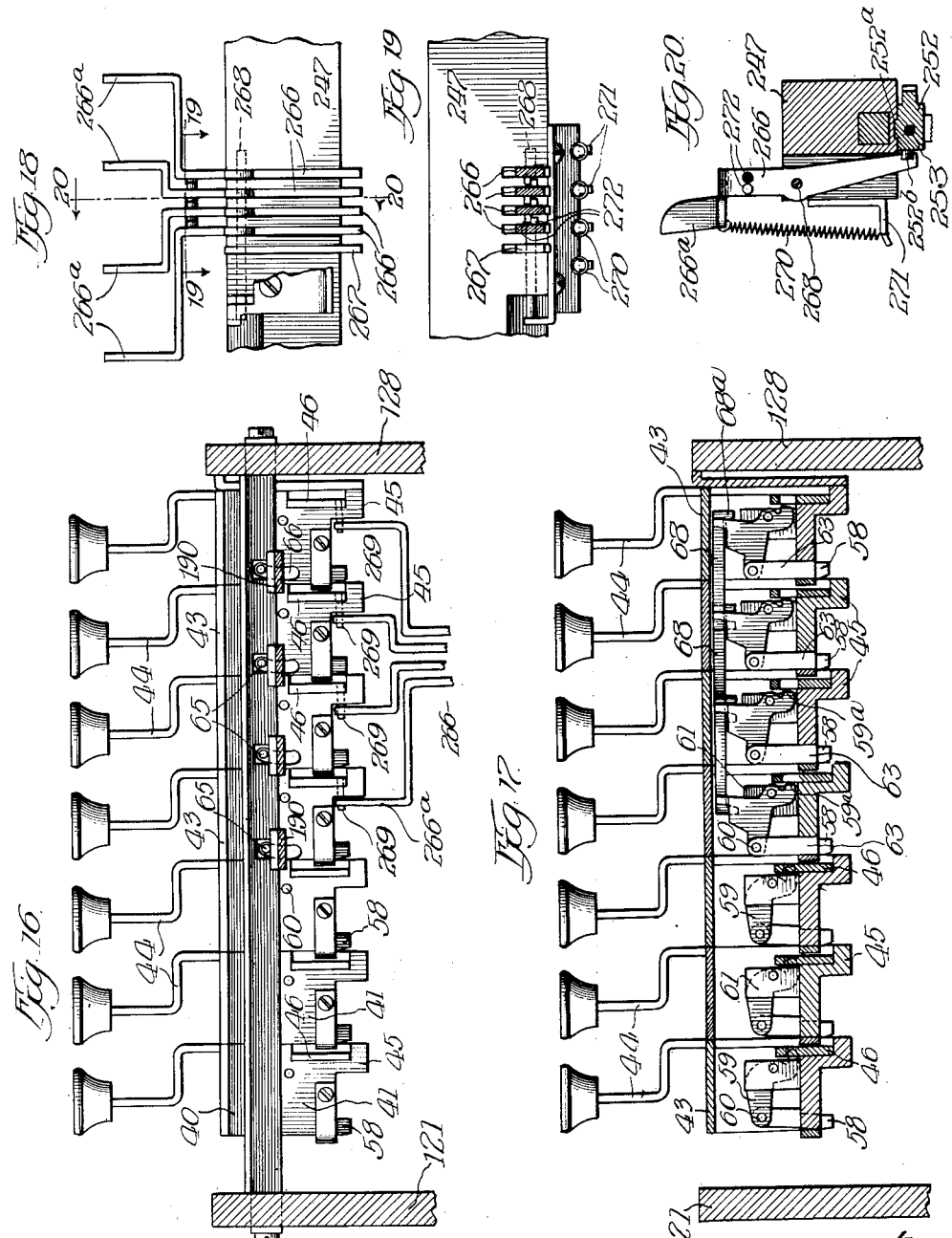

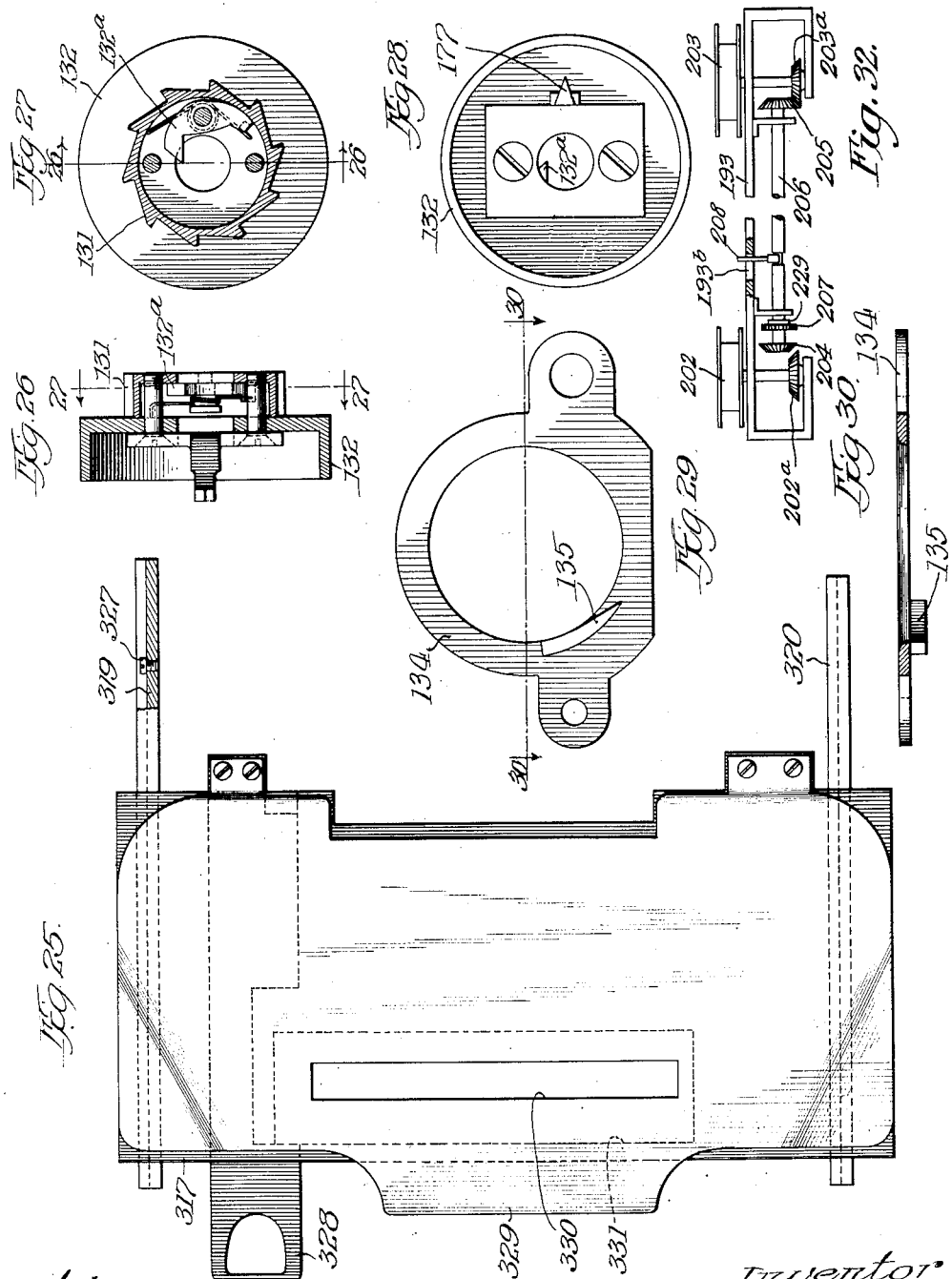

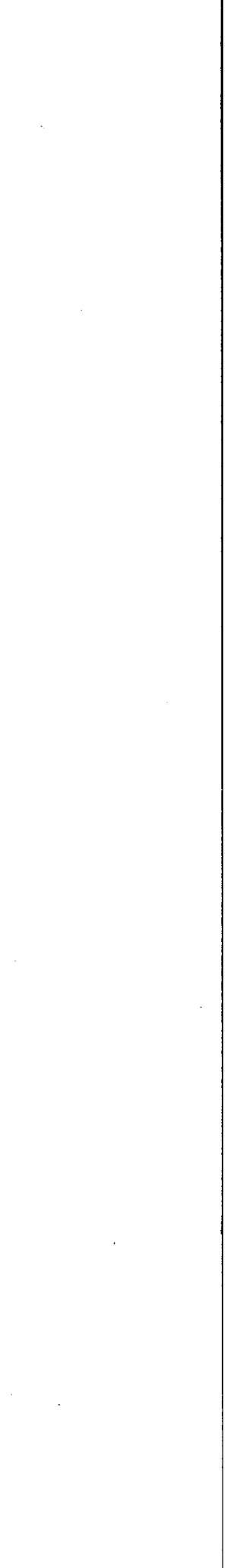

Patented Jan. 16, 1923.

1,442,059

UNITED STATES PATENT OFFICE.

IVAN ENGSTROM, OF CHICAGO, ILLINOIS, ASSIGNOR TO ACME APPLIANCE COMPANY, OF CHICAGO, ILLINOIS, A CORPORATION OF ILLINOIS.

COMBINED ADDING, LISTING, AND CHECK-WRITING MACHINE.

Application filed December 4, 1916, Serial No. 135,025. Renewed June 12, 1922. Serial No. 567,741.

*To all whom it may concern:*

Be it known that I, IVAN ENGSTROM, a citizen of the United States, residing at Chicago, in the county of Cook and State of Illinois, have invented certain new and useful Improvements in Combined Adding, Listing, and Check-Writing Machines, of which the following is a specification.

My invention relates to the class of machines used in business offices for the purpose of adding individual amounts and showing the total thereof on total indicating devices, listing individual amounts in a printed record and printing any desired individual amount upon a check in such manner that the printed amount on the check tears or shreds the paper to a certain degree and at the same time carries a special ink into the torn or shredded fibre of the check.

By my invention, I provide a common operating mechanism for the adding listing and check-writing devices which operating mechanism has a cycle of operation first placing the desired amount in printing position in the check-writing devices and the listing devices, after which continued operation of the operating mechanism inks the printing devices of the check-writing mechanism, permits placing the check in position to have a desired amount printed thereon and makes a record from the printing devices of the listing mechanism and check-writing mechanism.

An important feature of my invention consists in an improved set-up mechanism for determining the value represented by the printing devices brought into printing position subsequently by the operating mechanism in the check-writing and in the listing mechanism, this set-up mechanism being preferably in the form of a keyboard having ordered series of keys, one series for each order of value to be handled by the machine, and each series having one key for each significant figure of the corresponding order of units. My keyboard construction is further novel in that each series of keys is arranged in the natural sequence of said series, that is to say, the key of lowest value is farthest from the operator and the key of highest value of each series is nearest the operator. Or, in other words, with a decimal system of units each series of keys bears indications in descending order from nine to one inclusive extending from the operator towards the back of the machine.

My invention further provides a novel construction of adding machine or totalizing mechanism by which the ordered total indicating devices are each provided with an auxiliary device which is moved in a backward direction by each operation of the operating mechanism an amount corresponding to the particular amount set up in the corresponding order of units, and cooperating devices are provided by which the return movement of the operating mechanism moves the auxiliary devices forwardly and carries with them the total indicating devices to increase the total indication the amount of the set up. A novel form of carry-over mechanism is provided which is of the delayed carrying type, this mechanism being operated directly by the operating mechanism of the machine during each of its cycles of operation. The carry-over mechanism is normally in inoperative condition relatively to the total indicating devices, that is to say, its parts are in a position such that they do not actuate the total indicating devices when the carry-over mechanism is operated by the operating mechanism. When, however, one of the total indicating devices passes from its nine to its zero indication the carry-over device of next higher order is released so that it assumes an operative position after which the operation of the carry-over devices which takes place to complete the cycle of operation advances the total indicating device of next higher order one unit. The carry-over devices are in ordered arrangement corresponding to the arrangement of the total indicating devices and holding means are provided for retaining the ordered carry-over devices in the position to which they are moved during a first part of the cycle of operation of the operating mechanism and these holding devices are so related to each other that the holding device for the lowest ordered carry-over device is released during the end portion of each cycle of operation of the operating mechanism and the return to its normal position of the corresponding carry-over device in turn releases the holding device for the carry-over device of the next higher order, and so on throughout the series, as result of which it is impossible for the carry-over devices to operate during the advancing of the total indicating devices, and furthermore it is impossible for any two of the carry-over devices to simultaneously advance the corresponding total indicating devices.

The check-writing mechanism contains several novel features among which are a value-limiting device in the printing line for preventing insertion to the left of the highest digit printed another digit after the check has been printed in order to avoid the possibility of the check being raised. This value-limiting device normally occupies a position in the path of one or more of the printing devices of the check-writing mechanism and during a first part of the cycle of operation the value-limiting device is moved to the left along the printing line by just a sufficient amount to clear the printing device of highest order which is to be subsequently operated and moved to printing position to print the desired amount on the check. I am aware that value-limiting devices have heretofore been used to accomplish a similar result, but as far as I am aware the value-limiting devices of the prior art have normally occupied a position in the printing line to the left of the printing device of highest order, said value-limiting device being moved against the highest actuated printing device after the latter is set up in printing position. By my improved construction, should there be any failure on the part of the value-limiting device to properly operate, the operation of the machine as a whole would be incorrect but the check printed under these conditions would be of less than the desired value, whereas with the other type of value-limiting device under the same conditions a blank space would be left which would afford opportunity for tampering with the check. My improved construction, therefore, affords an added safeguard against tampering with one of the printed checks. By my construction the printing devices for the check-writing machine are normally in a position with their zero characters back of the printing line as a result of which when a zero is to be printed in any order of units the corresponding printing device must be moved from its normal or blank position to its zero position, the amount of this motion being preferably the same as the amount of motion required to move any one of the printing devices from one unit indication to the next higher unit indication. The keyboard mechanism above referred to is provided with stops preventing the motion of the printing devices from their blank to their zero position and when these blank stops are not withdrawn they retain the printing devices in substantially their normal or blank position. In carrying out my invention, I provide devices operated by the operating mechanism for lifting all of the blank stops at the end of each cycle of operation of the operating mechanism. In this condition the desired amount is set up on the keyboard mechanism and by the operation of the keyboard mechanism the operation of any one of the keys of any order provided with a blank stop moves a member into the path of the blank stop retaining said stop in its raised position. Furthermore, interlocking devices are provided between the blank stops so that the holding in its raised position of a blank stop of one order also holds in their raised positions all of the blank stops of lower order. When the desired amount has been set up on the keyboard mechanism subsequent operation of the operating mechanism during the first part of its cycle releases the blank stops and such of the blank stops as are not held in their raised position by the keyboard mechanism or in other words all of the blank stops of higher order than the highest order of keys actuated are released and drop in position to prevent subsequent motion of the operating mechanism moving the corresponding printing devices from their blank position in the check-writing mechanism. Interlocking mechanism is also provided between the keyboard mechanism and the value-limiting device to limit the motion of the value-limiting device to the left along the printing line so that it rests during a printing operation in the path of the printing devices of higher order than the highest actuated printing device.

While the keyboard mechanism might be provided with zero keys operating corresponding zero stops, I prefer to set the zero in the printing lines automatically and without any actuation of the keys whatever as a result of which each series of keys contains but nine keys as above referred to. To accomplish this result each series of keys is provided with a zero stop connected by suitable mechanism with all of the keys of the series so that the operation of any one of the keys of the series moves the zero stop from its operative position. If none of the keys of the series are operated the zero stop remains in its operative position to prevent motion of the corresponding printing devices farther than their zero position. In printing zeros therefore the printing devices are always moved from their blank position to their zero position, which can only be accomplished by removing the blank stops from the paths of the corresponding operating devices in the manner referred to. In carrying out my invention it will be understood that each of the series of keys may be provided with a blank stop, but I find it desirable to omit the blank stops on the three lowest orders of units, which, for printing a check, are the units and tens of cents and the units of dollars, since I find that this arrangement provides a simple arrangement of printing characters on the value-limiting device and between the dollars and cents indications. It will be understood that for simplicity of construction the various parts are duplicated as far as possible throughout the several orders of operating mechanism and the parts actuated thereby, as a result of which the operating mechanism for each order of units normally occupies substantially its blank position whether said order is provided with a blank stop in the keyboard mechanism or not and that, for the preferred arrangement in connection with the three lowest orders of units, the corresponding operating mechanism and the parts actuated thereby are always moved at least from blank position to zero position for each operation of the main operating mechanism. It will be noted that the motion of the operating mechanism from blank position to zero position is not a significant motion, that is to say, it is not a motion having value as a part of any set-up amount. Each motion of the total indicating devices on the other hand from one position to another is a significant motion since the total indicating devices are preferably in the form of wheels having thereon closed series of value indications. To compensate, therefore, for the motion of the operating mechanism from blank position to zero position, I provide disconnecting devices for interrupting the driving trains between the operating mechanism and the total indicating devices for amounts of motion corresponding to the motion of operating mechanism from blank to zero position so that only the significant motion of the operating mechanism in setting up any desired amount is communicated to the total indicating devices. I prefer to construct these disconnecting devices so that they are connected together and may be moved together from their normal position, securing the results indicated, to a second position continuously disconnecting or interrupting the operating trains of the operating devices, for which condition there is no operation of the total indicating devices for repeated operation of the set-up mechanism, the listing mechanism and the check-writing mechanism.

The check-writing mechanism also contains a novel construction of platen which is preferably of the corrugated type as are the printing characters co-operating therewith. By my construction the platen is divided into a plurality of elements or units mounted side by side along the printing line in a supporting housing, which housing is first movable as a whole by the operating mechanism to bring the platen elements nearly into engagement with the check, after which continued operation of the operating mechanism lifts the platen elements one at a time to force them one after another against the check and printing devices which may at the time be in the printing line. This naturally reduces the amount of force required to be exerted upon the operating handle and the resulting strain that is produced upon the operating mechanism connecting the handle with the platen. I further find it desirable to provide a yielding element in each of the operating trains of the platen elements, so that there may be a small amount of variation in the dimensions of the printing devices and the members constituting the platen operating trains, which results in requiring a less accurate grade of workmanship than where positive connections are employed throughout the operating trains.

My check-writing mechanism also contains a novel form of inking mechanism by which an ink carrier or pad is normally held in the path of the characters on the printing devices while they are being set to printing position, the ink carrier having a stop and operating connections extending to the operating mechanism so that the movable check carrier provided with the device cannot be moved to printing position until the stop has been removed from its path. When the operating mechanism is actuated to move the stop from the path of the check carrier it at the same time moves the inking device from its inking position out of the path of the check carrier, after which the latter may be inserted and the check printed. Devices are provided in the platen operating train for preventing motion of the main operating mechanism of the machine to print a check unless the carrier is first moved to its printing position, and when the carrier is thus moved to its printing position, the preventing mechanism is moved from the path of the operating mechanism so that its motion may be continued to move the platen against the check and printing devices to print said check. I also provide as a part of the platen operating train a movable element controlled by a setting key so that, when said element is not actuated, the operating train between the main operating mechanism of the machine and the platen operating devices is interrupted and for this condition no operation of the platen results. When the key is depressed, however, the operating train is completed and checks may be printed having amounts corresponding to the amounts set up on the keyboard mechanism.

In connection with the listing mechanism I provide printing devices which tend to move to printing position and are normally restrained from such motion by the parts of the operating mechanism co-operating with the keyboard mechanism. When the keyboard mechanism is actuated to set up a desired amount, the operating mechanism referred to is permitted to move a corresponding amount and the printing devices of the listing mechanism are permitted to move to bring the corresponding amount to the printing line. The support for the printing devices is stationary and each printing device is provided near the printing line with a yielding backing to compensate for slight irregularities in the construction of the said printing devices, so that a uniform impression may be had without requiring all of the printing devices to be of exactly the same dimensions. A platen is provided for the listing mechanism which is mounted in a movable support which support is actuated by the operating mechanism of the machine to print a record from the listing printing devices after the latter have been moved to a position corresponding to the set-up on the keyboard. A yielding element is provided in the platen operating train so that a desired degree of pressure is exerted by the platen upon the printing devices for each operation of the operating mechanism without requiring accurate workmanship in constructing the platen operating train. An advancing pawl is provided for the platen which pawl has a stationary pivotal support, for advancing the record of the listing machine one step for each actuation of the platen carrying support.

While the machine consists as described of totalizing mechanism, listing mechanism and check-writing mechanism, each performing its own function, it will be understood that but a single operating mechanism is employed for actuating these three mechanisms and that the set-up mechanism is necessarily employed to control the amount of actuation of the common operating mechanism, connections being employed between said common operating mechanism and the adding mechanism, the listing mechanism and the check-writing mechanism to operate the same an amount corresponding to the amount set up on the set-up mechanism. The adding mechanism is preferably assembled as a complete separate unit, so that it may be removed from the rest of the machine with its carry-over mechanism, and the set-up mechanism is preferably similarly constructed. Furthermore, the keyboard mechanism constituting the set-up mechanism is built up of similar units, one for each series of keys, which may be completely assembled individually so that all that is required to construct the entire keyboard mechanism is to assemble a plurality of the assembled series of keys. It will furthermore appear that the listing mechanism may be omitted, if desired, without in any way interfering with the remaining devices, as a result of which the machine may be used either as a combined adding, listing and check-writing machine, as a check-writing and adding machine, as a check-writing machine, as an adding and listing machine, as a check-writing and listing machine, as an adding machine, or as a listing machine, as desired, and that however used, all of the advantages of construction referred to above in general way are secured.

The above and other objects of my invention will more clearly appear in connection with the drawings showing one embodiment of my invention, which are as follows:

Fig. 1 shows in right hand side elevation the complete machine, to a reduced scale, Fig. 2 is a left hand side elevation of the complete machine, to a reduced scale, Fig. 3 is a full size front elevation of the complete machine, Fig. 4 is a full size rear elevation of the complete machine, Fig. 5 is a full size plan view of the back part of the machine and includes a portion of the keyboard, Fig. 6 is a full size view of the printing devices of the check-writing mechanism taken along the line 6—6 in Fig. 1, Fig. 7 is a full size view of the inking and platen mechanism of the check-writing mechanism taken along the line 7—7 in Fig. 1, Fig. 8 is a full size view of the operating mechanism for the check-writing mechanism taken along the line 8—8 in Fig. 5, Fig. 9 is a full size view of the operating mechanism for the adding and listing mechanism taken along the same plane of section as Fig. 8, Fig. 10 shows in a view similar to Fig. 8 the check-writer operating mechanism with the movable operating cam in operative position and the check carrier in its outermost position, and with the main operating mechanism partly operated, Fig. 11 is an enlarged view of the adding mechanism shown in Fig. 9 in the operated position of the carry-over mechanism, Figs. 12 and 13 are detail views of the holding devices employed in connection with the carry-over mechanism shown in Fig. 11, Fig. 14 is a full size side elevation of the keyboard assembly taken along the line 14—14 in Fig. 15, Fig. 15 is a full size top view of a portion of the keyboard assembly with parts of the keys and upper guide plates removed, Fig. 16 is a full size rear elevation of the keyboard assembly shown in Fig. 14, Fig. 17 is a sectional view of the parts shown in Figs. 14 and 15 taken along the line 17—17, Fig. 18 is a full size front view of the stop mechanism actuated by the keyboard for controlling the operation of the value-limiting device of the check-writing mechanism, Fig. 19 is a sectional view of the parts shown in Fig. 18, taken along the line 19—19, Fig. 20 is a sectional view of the parts shown in Fig. 18 taken along the line 20—20, Fig. 21 is an enlarged sectional view of one of the keyboard units taken along the line 21—21 in Fig. 14, showing the blank and zero stop mechanism, Fig. 22 shows in a view similar to Fig. 21 the zero stop in its operated position resulting from the depression of one of the keys.

Fig. 23 is an enlarged left hand side view of the rear end of the keyboard assembly showing the blank and zero stop controlling mechanism, Fig. 24 is a view similar to Fig. 23 showing the parts in their operated position resulting from the depression of a key, Fig. 25 is a full size plan view of the check carrier, Fig. 26 is an enlarged vertical sectional view of one of the total indicating wheels removed from its supporting shaft, taken along the line 26—26 in Fig. 27, Fig. 27 is a sectional view of the parts shown in Fig. 26 taken along the line 27—27, Fig. 28 is a left hand elevation of the parts shown in Fig. 26, Fig. 29 is an enlarged elevation of one of the disconnecting devices of one of the total indicating wheels, Fig. 30 is a sectional view of the disconnecting devices shown in Fig. 29 taken along the line 30—30, Fig. 31 is a plan view of part of the adding mechanism removed from the remaining portions thereof, and Fig. 32 shows in rear elevation the ribbon feeding and reversing devices for the listing mechanism.

Similar numerals refer to similar parts throughout the several views.

It will be understood in considering the construction of the machine that the mechanism may be broadly divided into two classes, first, that pertaining to the placing of the parts of the several component mechanisms in positions corresponding to desired individual amounts, and, secondly, the mechanism involved in making a record from the printing devices of the check-writing mechanism and of the listing mechanism as well as that involved in operating the adding machine to advance it a desired individual amount.

The mechanism of the first class, it will be understood, is ordered throughout the machine to correspond with the several orders of units contained within the capacity of the machine and the devices employed in connection with each order are duplicated in each of the other orders as far as possible, so that a detailed description of the mechanism for but one order will apply equally well to all of the other orders except as may hereinafter be described.

It will also be understood that the particular mechanism of the keyboard construction, of the adding mechanism, of the listing mechanism and of the check-writing mechanism are distinct from each other and connected together by the ordered devices of the common operating mechanism, as a result of which the construction may best be understood by first describing the keyboard mechanism, then the common operating devices and then in turn the adding mechanism, the listing mechanism and the check-writing mechanism.

*Keyboard mechanism.*

As shown in Figs. 14, 15, 16 and 17, the keyboard construction consists of a plurality of assembled units each having its own supporting member or base 40 which is preferably of cast metal forming the bottom of each unit and having upwardly extending end portions 41 and 42 supporting a top guiding plate 43. A plurality of keys 44 are mounted in grooves formed in the edges of the supports 40 and 43 by which the keys are properly spaced and guided, the keys of one unit being held in position by the support and guiding plate of the next unit. Each of the supports along its guiding edge is provided with a downwardly extending offset portion 45 providing a guideway inside of the keys 44 for a retaining member 46 extending longitudinally of the support 40 which retaining member is provided with a plurality of retaining hooks 47 having cam surfaces engaged by lugs 48 formed on the keys. The retaining member 46 is normally held in the position indicated in Fig. 14 by a spring 49 extending from the pin 50 projecting from the lower surface of the support 40 to a stud 51 carried by the retaining member 46 which stud projects from said member through a clearance opening 52 in the offset portion 45 of the support 40 for engagement with said spring. Each of the retaining hooks 47 is so conformed that when it engages one of the lugs 48 the retaining member 46 is held in a position somewhat to the right as shown in Fig. 14 from its normal position for a purpose to be described. Each of the keys 44 except the key 44ª is provided with a returning spring 55 held in position between the arm 53 and the support 40 by a lug 56 projecting downwardly from the under side of the arm 53. As a result of the construction, when the retaining member 46 is moved to the right as shown in Fig. 14 by the depression of one of the keys 44, any keys previously engaged by said retaining member are released and returned to their uppermost position by the springs 56 this motion being limited by the top plate 43. The stops 54 are spaced from each other an amount corresponding each to a unit of motion of the devices controlled by the keyboard. It will be observed that there are nine keys in each series of keys, these keys being numbered from front to rear of the machine in descending order, that is to say, 9, 8, * * * 1. The key 44$^a$ is the "9" key and has no stop carried thereby, a fixed stop 57 being rigidly carried by the support 40 to determine the maximum movement of the mechanism controlled by the keyboard since in no case can this motion be greater than that corresponding to nine significant units. The key 44$^a$, however, is provided with a short laterally-extending arm 53$^a$ for engaging its returning spring 55$^a$.

Each series of keys is provided with a zero stop 58 supported in a groove in the offset portion 45 in line with the stops 54 and spaced therefrom an amount equal to the spacing of the stops 54, which stop is normally in its lower or operative position and held in such position by a bell crank lever 59 pivotally supported as more clearly shown in Figs. 21 and 22 at 60 from an upwardly extending lug 61 carried by the support 40. When the retaining member 46 is in its normal position with all of the corresponding keys 44 released the lower end of the bell crank lever 59 rests in an aperture provided therefor and extending through the retaining member 46 as more clearly shown in Fig. 23. The projecting end 59$^a$ of the bell crank lever 59 is beveled as indicated to form a cam surface, as a result of which, motion of the retaining member 46 rearwardly moves said bell crank lever angularly upon its pivotal support a sufficient amount to lift the zero stop 58 until its end is substantially in the plane of the bottom of the support 40. As a result of the construction described, when the devices controlled by the keyboard mechanism are operated without the depression of one of the keys 44, the stop 58 is in the path of said devices and determines and limits the amount of their motion. When, however, one of said keys 44 is actuated, the retaining member 46 is held in a position somewhat to the rear of its normal position as above referred to which results in displacing the opening 62 from the bell crank lever 59 as indicated in Fig. 24, so that the zero stop is held in its raised position as long as the retaining member is held in its actuated position. As a result of this construction it will be noted that the operation of the zero stops is automatic and requires no zero key, and thus if zeros appear as a significant part of an amount set up they automatically appear in proper position in the mechanism controlled by the keyboard mechanism without the actuation of any key in the corresponding orders of keys on the keyboard.

In addition to the zero stops referred to, each series of keys except the three series of keys of lowest order, is provided with a blank stop 63 in line with the other stops of said series of keys and preferably spaced from the zero stop equal to the spacing of the other stops of the series. The blank stop 63 is connected at its upper end with one end of a bell crank lever 64 and a connecting pin 65 extending through a slot 66 in the end wall 41 of the support for a purpose to be described. The bell crank lever 64 is pivotally supported from the lug 61 upon the pin 60 and with the blank stop 63 in its lower position a projecting end 64$^a$ of the bell crank lever 64 extends into an aperture 67 formed through the retaining member 46 as more clearly shown in Fig. 23. As a result, when the blank stop 63 is in its lower position, the retaining member 46 cannot be moved longitudinally and the keys of the corresponding unit can not be actuated.

Each of the bell crank levers 64 is provided with an outstanding lug 64$^b$ having a groove in its upper edge for receiving two connecting bars 68, each of which bars has formed at each end a downwardly extending hook 68$^a$ for resting against one side of the lug 64$^b$, the other side of said lug being free from said connecting bar. One of said connecting bars extends in one direction and the other in the opposite direction each to an adjacent bell crank lever 64, as more clearly shown in Fig. 17, as a result of which, when the blank stop 63 of one order is raised all of the blank stops of lower order are raised through the operation of the connecting bars 68 without operating the blank stops of higher order.

In connection with the main operating mechanism of the machine devices are provided which, at the end of each cycle of operation, lift all of the pins 65 thus lifting the blank stops 63 to their inoperative position and clearing the projections 64$^a$ from the apertures 67 in the retaining members 46. With the apparatus in this condition, the first step in operating the machine is to set up the desired amount on the keyboard which may be accomplished, since the bell crank levers 64 cannot at this time interfere with the operation of the retaining members 46. When the desired amount has been set up on the keyboard and the corresponding keys retained in their depressed condition by the retaining members 46, the operating mechanism is actuated and during the first part of its cycle of operation the pins 65 are released by operation of the shaft 88 and rocking member 190 in a manner to be described thus permitting the blank stops 63 associated with the retaining members 46 which have not been actuated to drop into their operative position thus preventing operation from normal position of the corresponding ordered operating devices. The actuation, however, of the key of highest order of the amount set up moves and holds its retaining member in a position somewhat to the rear of its normal position as above referred to, thus displacing the aperture 67 from the projection 64ª on the bell crank lever 64, as a result of which, when said bell crank 64 is released by the release of its pin 65, the corresponding blank stop is held in raised position, since the projecting portion 64ª is at this time back of the body portion of the retaining member and out of line with the aperture 67. This permits the operating device of corresponding order to be moved to the position determined by the key actuated. To provide for the cases in which zeros should appear in lower orders of the amount set-up the connecting bars 68 serve at this time to maintain in raised or inoperative position the blank stops 63 of lower order than the particular blank stop held in inoperative position by the actuation of the retaining member 46 of higher order.

Each of the retaining members 46 as shown in Fig. 14 extends somewhat to the left of the end wall 42 and as more clearly shown in Fig. 8 a common releasing mechanism is provided for releasing all of the raised keys at the end of the cycle of operation of the operating mechanism. A bent plate 69 is secured to the end wall 42 and from the ends of the bent plate downwardly extending ears 70 are formed which support the end of a shaft 71. The shaft 71 affords the pivotal support for a releasing member 72 extending transversely across the projecting ends of the retaining members 46. An ear 73 is formed on the lower portion of the releasing member 72 at one end which is pivotally connected at 74 with one end of a connecting link 75, the other end of which is pivotally connected at 76 with the upper end of a lever 77 pivotally supported at 78 from the side plate of the machine. The lever 77 carries a cam 79 engaging a ratchet wheel 80 pivotally supported at 81 from the side plate of the machine. As a result of the construction described, when the ratchet wheel 80 is rotated in the direction indicated by the arrow the lever 77 is operated by the cam 79 to move the connecting link 75 and thus operate the releasing member 72 which moves all of the retaining members 46 to their releasing positions and permits all of the keys to occupy their outermost or normal position. An operating pawl 82 is supported by a spring 83 carried by a lug 84 extending inwardly from plate 85 secured as indicated in Fig. 15 to the bent plate 69 at 85ª. The pawl 82 is pivotally connected at 86 to a lever 87 carried by a rock shaft 88 which is rotated at the beginning of each cycle of operation of the operating mechanism a sufficient amount to move the pawl upward on the ratchet wheel 80 one tooth and at the end of each cycle of operation the shaft 88 is rocked a sufficient amount in the reverse direction to rotate the ratchet wheel 80 one tooth in the direction indicated by the arrow thus operating the lever 77. The devices employed for rocking the shaft 88 will be explained later. A repeating key 89 is employed to disconnect the releasing train and this key is supported by the lug 84 and provided with a lug 90 extending over the projecting end of the pawl 82 so that depression of the key moves the pawl downward out of engagement with the ratchet wheel 80. A latch 91 pivotally supported at 92 from the plate 85 and actuated by a spring 93 carried by the lug 84 is provided to swing over the lug 90 in its depressed position to hold the repeating key 89 in its depressed position. As a result of this construction when it is desired to repeatedly actuate the operating mechanism with the same set-up on the keyboard, any desired set-up may be retained and the amount repeatedly added into the adding mechanism or listed in the listing mechanism or printed on checks when the repeating key 89 is in its depressed position. A releasing key 94 also supported by the lug 84 carries a pin 95 co-operating with an extending arm 96 projecting from the latch 91. When the releasing key 94 is depressed the latch 91 is swung upon its pivot 92 against the action of the spring 93 to release the key 89 and permit it to return to its normal position under the action of the returning spring 97 supported by the lug 84. At the same time that the key 89 is released by the depression of the key 94, a cam 98 carried by the key 94 engages a cam 99 carried by the connecting link 75 and moves said link to the right as seen in Fig. 8 to operate the releasing member 72. The spring 97 also serves to hold the releasing key 94 in its upper position.

*Operating mechanism.*

The operating mechanism of the machine consists, as shown in Fig. 9, primarily of a plurality of ordered operating slides 100 slotted longitudinally and supported longitudinally of the machine by transverse rods 101 and 102 extending between and supported by the side plates of the machine. Each of the operating slides has near its rear end a downwardly extending lug 103 carrying a roller 104 for engagement with an operating lever 105 carried by a rock shaft 106. Each lever 105 has extending therefrom a second lever 107, the end of which rests over a roller 108 carried by the lower offset end of one of the listing slides 109. The rock shaft 106 has rigidly secured thereto a crank 110 carrying at its outer left hand end as shown in Fig. 9 a roller 111 which, as more clearly shown in Fig. 1, rests against the surface of a cam 112 rigidly secured to the operating shaft 113. An operating handle 114 is carried by the shaft 113 and is preferably secured thereto by having the inner end of its boss 114ª stepped as shown in Fig. 4 to engage the similarly formed end of the boss 112ª formed on and extending outwardly from the cam 112, the boss 112ª being securely pinned to the operating shaft 113 and the boss 114ª being held in place by a screw 115 extending into the end of the shaft 113, so that the handle 114 may be readily removed from said shaft when desired. As a result of the construction described, when the handle 114 is moved forwardly the crank 110 is rotated and with it the rock shaft 106. The rock shaft 106 also carries a third lever 116 rigidly secured to the rock shaft for engaging the front side of the roller 104 carried by the corresponding operating slide 100. Each pair of levers 105 and 107 is free to turn upon the shaft 106 except as they are prevented therefrom by a helical spring 117 located upon the shaft 106 and engaging at one end the rear edge of the lever 105 and at the other end a pin 118 extending from the lever 116 as shown in Fig. 4. The spring 117 is made sufficiently strong to drive all of the mechanism actuated by the operating slide 110 and forms a yielding connection between the operating lever 105 and the shaft 106 permitting continued operation of the shaft 106 if the slide 100 is stopped in its motion before it has been moved an amount corresponding to the full amount of operation of the rock shaft. Each operating slide 100 is in line with stops controlled by the series of keys 44 of the same order as a result of which the amount of motion of any operating slide for a cycle of operation of the operating shaft is determined by the particular stop of the corresponding order lying in its path as a result of a particular set-up on the keyboard. After engaging the various stops of the keyboard mechanism, the operating slides 100 remain in their stopped positions for continued forward motion of the operating handle and when the operating handle 114 is moved in a backward direction to continue its cycle of operation and the cam 112 is rotated to permit the rock shaft 106 to return to its normal position a returning spring 119 connected between the crank 110 and the stud 120 carried by the side plate 121 of the machine as shown in Fig. 1 moves said crank 110 and the rock shaft 106 to return the same to normal position, thus rotating the levers 116 which by their engagement with the rollers 104 move the operating slides and the parts carried thereby to their normal position.

The operating slides referred to are connected with and determine the amount of motion of the printing devices of the check-writing mechanism and the operating mechanism of the adding mechanism and the levers 107 permit motion of the printing devices of the listing mechanism amounts corresponding in each case to any particular set-up on the keyboard, as will be described below.

*Adding mechanism.*

Each of the operating slides 100 has formed on its upper edge a rack 100ª which, as indicated in Figs. 8 and 10, meshes with an intermediate gear 122 loosely mounted on a supporting shaft 123. Each intermediate gear in turn meshes with a gear 124 carried by the shaft 125 which supports the total indicating wheels. The shafts 123 and 125 are supported by and between the side plates 126 and 127 shown in Fig. 5, which constitute supports for the adding and carry-over mechanism so that said mechanism may be assembled as a separate unit and removed bodily from between the side plates 121 and 128 of the machine. The gears 122 are maintained in proper position upon the shaft 123 in alignment with the racks 100ª and the gears 124 by suitable spacing devices not shown. Each of the gears 124 carries a pin 129 which, as more clearly shown in Fig. 10, carries an operating pawl 130 for engaging the teeth of a ratchet wheel 131 carried by a total indicating wheel 132. Each of the gears 124 carries a spring 133 tending to hold its pawl 130 in engagement with the ratchet wheel 131. As a result of the construction described, when one of the operating slides 100 is moved toward the front of the machine the pawl 130 of the corresponding order is moved backward on its ratchet wheel 131 a corresponding amount and when the said operating slide is returned to its normal position the ratchet wheel 131 and the total indicating wheel 132 connected therewith are advanced an amount corresponding to the motion of the operating slide and, therefore, corresponding to the set-up of the corresponding series of keys of the keyboard.

To compensate for the motion of the operating slide from its blank position to its zero position, each pawl 130 has associated therewith a cam ring 134 having a projecting cam lug 135 for engaging the free end 130ª of the pawl, so that when the end 130ª is under said cam lug the pawl is disengaged from its ratchet wheel. The cam lug is so disposed angularly that it engages the pawl 130 for motion of the corresponding operating slide from its blank to its zero position, releasing said pawl and permitting it to engage its ratchet wheel when the corresponding operating slide moves from its zero position to a higher position determined by the set-up of the corresponding series of keys. For convenience the spacing of the blank and zero stops above referred to in connection with the keyboard is equal to unit spacing between the other stops of the keyboard, which permits the use of a ten-tooth ratchet wheel in the adding mechanism and a cooperation between the cam lug 135 and the pawl 130 of sufficient extent to hold the pawl from engagement with the ratchet wheel for an amount of angular motion equal to one tooth of the ratchet wheel. Or in other words, the maximum amount of advance of a ratchet wheel for a single operation of the corresponding operating slide is nine teeth or nine units of advance of the corresponding total indicating wheel, which is as it should be since the series of indicating characters on the total indicating wheel are ten in number. The detail construction of the cam ring 134 is more clearly shown in Figs. 29 and 30.

The several cam rings 134 are mounted upon transverse rods 136 and 137 as shown in Fig. 5 the rod 136 being rigidly supported by the side plates 126 and 127 of the adding mechanism, while the other rod 137 extends through said side plates and is provided with spacing tubes 138 rigidly securing said cam rings 134 to said rod 137. The rod 137 is provided with a knob 139 on the left hand side of the machine and at its other end with a spring 140 normally holding said rod in position so that the cam lugs 135 are in the planes of the projecting free ends 130ª of the pawls 130. When it is desired to operate the other parts of the machine without adding the individual amounts into the total indicating wheels, the knob 139 is pressed inwardly when the operating slides are in their normal position and the pawls 130 are in engagement with the cam lugs 135, which serves to move the cam rings 134 longitudinally of the shaft 125 so that the free ends of the pawls 130 rest inside of the cam rings 134 which serve when in this position to maintain the pawls out of engagement with the corresponding ratchet wheels for any amount of angular motion of said pawls. The cam rings 134 are rigidly held in place on the rod 137 as follows: The end spacing tube 138ª is rigidly secured to the rod 137 by a pin 141. The cam rings and the spacing tubes 138 are then assembled on the rod in the relation shown in Fig. 5, and a short spacing tube 138ᵇ is placed on the rod outside of the end cam ring. The rod has extending transversely through it an elongated slot 142 through which a pin 143 extends. The end portion of the rod is drilled and threaded to receive a screw 144, the inner end of which engages the pin 143 so that by turning the screw into the rod the pin 143 is forcibly pressed against the end of the spacing tube 138ᵇ and thus serves to securely clamp the cam rings between the several spacing tubes above referred to. The cam rings 134 are free to slide on the other supporting rod 136.

An ordered carry-over mechanism is provided in connection with the total indicating mechanism constructed as follows: A plurality of spaced plates 145 is supported in vertical position longitudinally of the machine on the transverse rods 146, 147 and 148, which rods are rigidly supported by the side plates 126 and 127 of the adding mechanism. Each of the plates 145 is provided with a downwardly extending arm 145ª to the lower end of which is pivoted at 149 a lever 150. The pivot 149 also supports a second lever 151 which is normally held by a spring 152 against a lug 153 carried by the lever 150. The lever 151 has pivoted to its lower end at 154 a latch 155 normally held in engagement with a lug 156 on the lever 151 by a spring 157. The latch 155 has a downwardly extending arm in the path of a pin 158 carried by the corresponding lever 116, as a result of which, when the lever 116 is moved forwardly by the operation of the rock shaft 106 the lever 151 is rotated upon its pivot 149, which, through the operation of the spring 152 also rotates the lever 150 upon said pivot. The spring 152 permits the lever 116 to move the lever 150 the full amount of possible motion of the latter, after which continued motion of the lever 116 moves the lever 151 relatively of the lever 150 to permit the pin 158 to pass the lower end of the latch 155. When the lever 116 is returned to its normal position the spring 157 yields to permit the latch 155 to turn upon its pivot 154 thus permitting the pin 158 to pass the latch 155 without motion of the levers 151 and 150 to their normal position.

As more clearly shown in Fig. 11, each of the levers 150 carries at its upper end a pin 159 working in a slot 160 in the lower end of the short arm of a bell crank carry over pawl 161, which is pivotally supported at 162 on a sliding plate 163 mounted upon rods 164 and 165 extending between and carried by the side plates 126 and 127 of the adding mechanism. Slots 166 and 167 are formed through the plate 163 to permit said plate to move transversely of said rods 164 and 165 in a horizontal direction. The carry-over pawl 161 is provided with an upwardly extending arm 161ª the end of which is in the plane of one of the ratchet wheels 131. The pawl has two positions, first, its operative or upper position in which the end of the arm 161ª engages the ratchet wheel 131 when the plate 163 moves toward the front of the machine, and an inoperative or lower position for which the end of the arm 161ª clears said ratchet wheel when the plate 163 is reciprocated on its supporting rods 164 and 165. The long arm of the carry-over pawl 161 is extended beyond the arm 161ª to engage a holding latch 168 which, when in engagement with the carry-over pawl, holds it in its lower or inoperative position. A torsion spring 169 is supported on a stud 170 extending from the plate 163 and the ends of this spring en-engage respectively a post or lug 171 projecting from the plate 163 and a lug 172 projecting from the carrying pawl 161. Near its left hand end, as shown in Fig. 11, the carrying pawl is provided with a slot 173 for receiving a headed stud 174 carried by the plate 163 to guide and hold the left hand end of the carrying pawl 161 in proper position relatively to its supporting plate 163. The holding latch 168 is rigidly secured to a tripping lever 175 which, together with the holding latch 168, is pivotally supported upon a stud 176 projecting from and carried by the plate 163. The tripping lever 175 is in the plane of an operating lug 177 carried by the total indicating wheel 132 of next lower order as a result of which, when the wheel 132 of said lower order passes from its nine to its zero indication, the operating lug 177 engages the tripping lever 175 to move the holding latch 168 from engagement with the left hand end of the carrying pawl 161 thus permitting the spring 169 to raise the carrying pawl to its operating position, for which position subsequent motion of the plate 163 and the carrying pawl towards the front end of the machine advances the ratchet wheel 131 and the total indicating wheel 132 of next higher order one unit. A spring 178 carried by the stud 176 is provided which tends to hold the tripping lever 175 and the holding latch 168 in the position indicated in Fig. 11, the ends of said spring resting respectively against a pin 179 and the connecting member between the tripping lever 175 and the holding latch 168. When the tripping lever 175 is actuated by the projecting lug 177, the lower end of the latch 168 is moved into a clearance slot 180 formed through the left hand end of the carrying pawl 161, the edge of which slot holds said latch and tripping member in the position into which they are moved by the lug 177 as long as the carrying pawl 161 is in its raised position.

A holding pawl 181 pivotally supported upon the rod 165 is provided for each of the ratchet wheels 131 for preventing back rotation of said ratchet wheel and the engaging end of the holding pawl is rounded as indicated at 181ª to slightly move the ratchet wheel 131 to its proper angular position, assuming that the operation in a forward direction of the ratchet wheel 131 either by the corresponding operating slide or by the carrying pawl is not quite sufficient for the corresponding tooth to quite clear the end of the holding pawl. The holding pawl 181 therefore not only serves to prevent back rotation of the ratchet wheel but also serves to bring said ratchet wheel and the total indicating wheel 132 secured thereto into alignment with the reading line of the total indication of the total indicating wheels. Each holding pawl 181 is provided with a laterally extending arm 181ᵇ which has an ear 181ᶜ connected with its other end and lying in a plane parallel with the holding pawl and provided with an opening for receiving the rod 165, the ear 181ᶜ and the holding pawl 181 being so spaced as indicated in Fig. 5 by the arm 181ᵇ as to serve as a spacer for holding the plate 163 against the plate 145. This construction is more clearly shown in Fig. 31. A spring 182 is provided for each holding pawl 181, which spring is mounted upon rod 165 between the ear 181ᶜ and the pawl 181 with its ends extending into engagement with the arm 181ᵇ and a pin 183 carried by and extending away from the observer from the next plate 145, towards the observer from the particular devices shown in Fig. 11.

Each of the plates 145 has formed on its left hand edge a forwardly projecting arm 184 which carries at its forward end a horizontally projecting ear 185 for pivotally supporting at 186 a detent 187 for engaging a vertical flange 163ª extending laterally from the forward edge of the sliding plate 163 when said sliding plate is moved to its operated position, the end of the detent being provided, as indicated in Fig. 12, with a shouldered portion 187ª for securing a desired amount of engagement between said detent and said flange. Each detent 187 carries a downwardly extending lug 187ᵇ for receiving one end of a helical spring 188 the other end of which is supported upon the pin 171, as a result of which the spring 188 tends to move the detent 187 into its holding position for retaining the corresponding sliding plate 163 in its operated position when said sliding plate has been moved by the lever 150 to said operated position. The spring 188 also tends to return said sliding plate 163 from its operated position to its normal position when such motion is permitted by the withdrawal of the corresponding detent 187. Each of the detents 187 is provided with a tripping arm 187ᶜ engaged by the forward edge of the sliding plate 163 above its flange 163ª of next lower order than the sliding plate 163 engaged by the detent 187, as a result of which, when a sliding plate 163 of lower order is released and returned to its normal position by the operation of its spring 188, it engages the tripping arm 187ᶜ of the detent 187 of next higher order and moves said detent against the action of its spring 188 into releasing position, thus permitting the corresponding sliding plate to return to its normal position, which in turn releases the detent of next higher order, and so on throughout the entire series of sliding plates, as a result of which the carrying pawls 161 move from their operated position towards the front end of the machine one after another beginning with the carrying pawl of lowest order and each carrying pawl completes its carrying operation before the carrying pawl of next higher order begins its forward movement. The tripping arm 187$^d$ carried by the detent 187 of lowest order has its free end bent downwardly as indicated more clearly in Fig. 13 for effective engagement with a downwardly extending arm 189 carried by a rocking member 190 rigidly secured to the rock shaft 88 above referred to in connection with the keyboard mechanism. The forward edge of the rocking member 190 rests under the pins 65 as shown in Fig. 14 and the adjustment of the rocking member on the shaft 88 is such that when said shaft is rocked to a position to release the previously actuated keys at the end of each cycle of operation of the operating mechanism the rocking member 190 lifts the pins 65 to their upper position removing the blank stops from the path of the corresponding operating devices as referred to in connection with the keyboard mechanism. This operation of the rock shaft also rotates the downwardly extending arm 189 from the position indicated in Fig. 11 to that shown in Fig. 14, thereby engaging the free end of the tripping arm 187$^d$ and moving the detent 187 of lowest order from engagement with its sliding plate 163.

As a result of the construction described, it will be seen that the sliding plates 163 of the carry-over mechanism are moved to their operated position by forward motion of the operating handle, in which position said sliding plates are held by the detents 187; during the return movement of the operating handle the total indicating wheels 132 are operated and each is advanced an amount corresponding to the set-up of the keyboard for the corresponding order of units; each of the total indicating wheels which passes during its advance to its zero position actuates the tripping lever 175 connected with the holding latch of next higher order thus permitting the carrying pawl of said higher order to move to its upper or operative position, after which continued movement of the operating handle in its backward direction at the end of its operating cycle results in a rocking of the shaft 88 in a manner to be described, so that the rocking member 190 lifts the pins 65 and releases the detent 187 of lowest order which permits the sliding plate 163 of lowest order to move to its forward position and this by the release of the second detent permits the movement of the second sliding plate 163 to its forward position, and so on throughout the series of sliding plates, thus moving the carrying pawls one after another to their forward position and only advancing the totalizer wheels corresponding to the carrying pawls previously released from their holding latches, each one unit. As a result of this sequence of operation, there is no possibility of simultaneous operation of the total indicating wheels by the operating slides and the carrying pawls and there is, further, no possibility of simultaneous operation of the carrying pawls to operate the total indicating wheels which insures that the correct amount of advance shall be imparted to each total indicating wheel by a complete cycle of operation to add to the previous total indication the amount set up on the keyboard mechanism.

After the operation of the adding mechanism as described, the forward motion of the operating handle during the next cycle of operation again returns the sliding plates 163 to their rear position and at the same time, through the operation of the levers 150 upon the carrying pawls 161, any of the carrying pawls released during the preceding cycle of operation are moved downwardly and held by their holding latches in their lower position until again released by the operation of the total indicating wheels in the manner above described.

From the above description it will appear that all of the adding mechanism, including the carry-over mechanism, is carried by the side plates 126 and 127, which may be secured to and between the plates 128 and 121, respectively, of the machine in any desired manner, as, for example, by means of screws 191 as indicated for the side plate 126 in Fig. 11.

Provision is made for setting all of the total indicating wheels to their zero position, as follows: The shaft 125 as shown in Fig. 11 is provided with a longitudinal keyway 125$^a$ for receiving the free ends of the pawls 132$^a$ pivotally mounted inside of the ratchet wheels 131, as more clearly shown in Figs. 26 and 27. The shaft 125 carries on its end outside of the side plate 127 a setting knob 240, which is rigidly secured to said shaft. The pawls 132$^a$ are so arranged that since the parts of the total indicating mechanism which are mounted on the shaft 125 are free to rotate thereon, the total indicating wheels may be advanced without moving the supporting shaft 125. When, however, the supporting shaft 125 is rotated in the same direction as the advance of the total indicating wheels by means of the knob 240, the keyway 125ª engages the free ends of the pawls 132ª and rotates the ratchet wheels 131 and the adding wheels 132 in a forward direction and, since the pawls 132ª are similarly located angularly of the indicating characters on the adding wheels, the zeros on the adding wheels are brought into line with each other and by continued rotation of the adding wheels, may be brought into the reading line or position.

Listing mechanism.

The listing slides 109 are mounted in vertical position at the rear end of the machine in guides formed therefor in the plates 192 and 193 extending transversely of the machine between its side plates 121 and 128 and supported thereby as shown in Fig. 9. The plate 192 is of angular cross section and has formed in its horizontal member the guides referred to, from which member downwardly extending ears 192ª project, as more clearly shown in Fig. 4, to support a transverse rod 194 extending through longitudinal slots 195 formed in the listing slides 109. The plate 193 also carries downwardly extending ears 193ª for supporting a rod 196 extending through slots 197 formed through the listing slides. The rods 194 and 196 and the guideways formed in the plates 192 and 193 co-operate to retain the listing slides in proper position, so that they may be moved vertically in the guideways by the springs 198 amounts determined by the positions to which the levers 107 are moved by the operating mechanism in the manner above described. Each of the listing slides carries on its edge near its upper end a series of printing characters 109ª which serve, when moved into the printing line just above the plate 193, to print a record upon the record strip 199 in the following manner: As more clearly shown in Fig. 5, plate 193 carries on either side of the listing slides 109 guide rollers 200 for guiding a printing ribbon 201 just to the rear of the listing slides and along the printing line thereof, suitable spools or reels 202 and 203 being mounted upon the plate 193 to serve as supply and receiving spools for said ribbon. The spools 202 and 203 are provided with beveled gears 202ª and 203ª respectively engaging beveled gears 204 and 205 carried by the horizontal shaft 206 movably supported by bearings carried by the plate 193 so as to bring one or the other of said beveled gears into mesh with the corresponding beveled gear carried by the ribbon spool and at the same time removing the other of the beveled gears 204 and 205 from engagement with its beveled gear carried by the other ribbon spool. The shaft 206 carries a ratchet wheel 207 by rotation of which the ribbon spools may be operated and the ribbon moved along the printing line. A pin 208 extends upwardly through a slot 193ᵇ as shown in Fig. 32 and carries at its lower end a fork resting in a groove in the shaft 206 so that motion of the pin 208 in the slot moves the shaft 206 longitudinally in its bearings to bring either desired one of the gears 204 and 205 into engagement with the corresponding beveled gear.

The record strip 199 extends around a roller platen 209 rotatably mounted between the upper ends of the arms 210 which are rigidly secured to a rock shaft 211 pivotally supported between the side plates 121 and 128 of the machine. The arms 210 also carry between them a guiding roller 212 for leading the record strip from the supply roller 213 mounted upon the spindle 214 between extensions 210ª from the arms 210, so that said record strip is held by said guiding roller 212 in engagement with the roller platen 209 to be fed thereby from one position to another as the platen may be rotated. The platen 209 carries a ratchet wheel 215 engaged by the pawl 216 pivotally supported upon the rod 196 and held in engagement with the ratchet wheel by a spring 217 carried by the rod 196, the ends of said spring engaging said pawl and shaft 206. The arms 210 carry at their upper ends adjacent the printing surface of the platen 209 a shield 218 slotted along the printing line to permit the printing characters of the listing slides which are in the printing line to make a record upon the record strip 199 and preventing accidental engagement with said printing characters.

The shaft 211 has rigidly secured thereto an operating lever 219 and adjacent to this lever 219 a second lever 220 is rotatably mounted upon said shaft 211 and secured to the lever 219 by a spring 221 the ends of which engage pins carried by the levers 219 and 220. The lever 220 carries a pin 222 engaging a forwardly extending lug 219ª carried by the upper portion of the forward end of said lever 219 as a result of which the lever 220 may be moved downwardly, moving the pin 222 away from the lug or stop 219ª by stretching the spring 221 so that the lever 220 is moved to a greater extent than that permitted by the motion of the shaft 211 and the parts rigidly secured thereto. When the lever 220 is released, however, the spring 221 again brings the pin 222 into engagement with the lug 219ª. A spring 223 having its ends in engagement with one of the arms 210ª and a stud 224 projecting from the side plate 128 tends to hold the arms 210 in the position shown in Fig. 9, which is the inoperative or position of rest for said arms, the shaft 211 and the parts carried thereby.

The operating shaft 113 has rigidly secured thereto a second cam 225 carrying a laterally projecting pin 226 which rests over the forwardly extending end of the lever 220. This forwardly extending end of lever 220 is curved to form a cam surface having a first portion $220^a$ which is a delay surface and a second portion $220^b$ which serves when the pin 226 is rotated over it to move the lever 220 downwardly and thus rock the shaft 211 and move the platen 209 against the printing characters of the operating slides in the printing line to make a record therefrom. The cam surface $220^b$ is preferably constructed so as to impart an amount of motion to the lever 220 slightly in excess of that required to move the platen to its position of engagement with the printing characters of the listing slides, so that the spring 221 is stretched somewhat during a printing operation to insure a uniform amount of printing pressure upon the listing slides for each printing operation. This construction also avoids the necessity for accurate workmanship, since the spring 221 will compensate for any inaccuracies that might reasonably occur as a result of ordinary punch press work. To further compensate for possible inaccuracies in the dimensions of the listing slides, each of said slides is provided with a yielding or spring backing element 227 carried by the plate 193 in engagement with the forward edge of the listing slide, as a result of which during each printing operation there is a small amount of give or yield to each of the yielding backing elements 227, thus insuring a uniform impression by the printing characters on each listing slide for each operation, even though the dimensions of the parts may vary somewhat from each other.

It will be understood that the listing slides 109 are in ordered arrangement corresponding with the operating slides 100, as a result of which for any operation of the operating slides resulting from a particular set-up on the key-board mechanism the springs 198 move the listing slides to bring a corresponding amount into printing position, after which continued motion of the operating shaft moves the platen against the printing characters which are in the printing line to make a record on the record strip 199 from said characters and since these characters are arranged in series corresponding with the series of keys of the keyboard mechanism, an amount will be printed by each operation corresponding to the amount set up on the keyboard mechanism. Each of the listing slides normally has its zero character below the printing line and a blank in the printing line, as a result of which, on account of the operation of the operating slides above described in connection with the keyboard mechanism, when an amount is set up on the keyboard mechanism not involving one or more of the higher orders of units the corresponding listing slides will not move from their blank position during the subsequent printing operation, but on the other hand the highest ordered listing slide involved in printing the amount of the set-up will be that slide corresponding to the highest order of actuated keys on the keyboard, or in other words, no characters are printed upon the record strip 199 at any time to the left of the highest significant figure in any amount. Furthermore, as a result of the construction and operation of the keyboard and operating mechanism already described, when a set-up amount contains zeros to the right of the highest significant figure, for which condition, as has been pointed out, the corresponding orders of keys of the keyboard mechanism require no operation whatever, the slides of the listing mechanism are automatically moved from their blank to their zero position at the same time that the operating slides for the corresponding orders of units are moved from their blank to their zero position, since at this time the blank stops in the keyboard mechanism are removed from the paths of the corresponding operating slides in the manner above described.

The shaft 88 carries a downwardly extending crank 228 which for convenience is made in one piece with the crank or lever 87 and the lower end of this crank 228 is pivotally connected with the forward end of a link 229 which at its rear end is provided with a slot 230 supporting said link at its rear end and permitting reciprocation of the same. The link 229 has pivoted thereto near its rear end a pawl 231 engaging the ratchet wheel 207 and since the shaft 88 is rocked at the beginning and end of each cycle of operation, first in a direction moving the link 229 to the right as shown in Fig. 9 and, secondly, in the reverse direction it will be seen that the cooperation between the pawl 231 and the ratchet wheel 207 advances the ribbon along the printing line a desired amount for each cycle of operation of the operating mechanism.

The rock shaft 88 above referred to is operated in the following manner: The cam 225 has formed on its forward edge as shown in Fig. 9 a cam surface $225^a$ which during the first part of each cycle of operation engages a roller 232 extending through a slot 233 in the side plate 128 of the machine and pivotally supported upon a lever 234, which in turn is pivotally mounted at 235 on the outside of the side plate as more clearly shown in Fig. 2. The lever 234 has an extending arm $234^a$ which carries a pin 236 engaging a slot in the free end of a lever 237 rigidly secured to the end of the shaft 88, as a result of which when the cam surface $225^a$ engages the roller 232 and operates the lever 234, the shaft 88 is rocked in a clockwise direction for the relation of parts shown in Fig. 2 and in the reverse direction for the relation of parts shown in Fig. 9, and at the end of each cycle of operation the release of the roller 232 from the cam surface 225ª permits the returning spring 238 connected between the pin 239 projecting from the side plate 128 and the lower end of the arm 234ᵇ of the lever 234 to return the lever 234 and the parts operated thereby to their normal position which rocks the shaft 88 in the reverse direction to that just described.

*Check-writing mechanism.*

As shown in Fig. 9, each of the operating slides 100 has formed through its left hand end a slot 241 for receiving a pin 242 projecting laterally from an upwardly extending arm 243ª formed on one of the printing slides 243 of the check-writing mechanism. The slots 241 are provided so that slight inaccuracies in workmanship may not produce a binding action and interfere with the free operation of the parts. Each of the printing slides 243 is provided with a longitudinal slot 243ᵇ which extends substantially the length of the printing slide for receiving therethrough the transverse supporting rods 244 and 245 as shown in Fig. 10. The rod 245 is preferably constructed by flattening the opposite sides of a round rod and grooving the same between its flattened sides to receive the printing slides, the spacing of the grooves being of such a distance as to bring the printing characters 246 carried by the printing slides immediately adjacent to each other. The rod 244 extends through a supporting block 247 which in turn extends between the side plates 121 and 128 of the machine and is supported thereby. The supporting block 247 is slotted to receive the printing slides 243, the spacing of the slots being the same referred to for the rod 245. Since it is desirable to have the slides 243 closer together than are the operating slides 100, since the latter are spaced according to the spacing of the series of keys of the keyboard mechanism, the arms 243 are correspondingly offset as shown in Fig. 3 to form the connections described between the operating slides 100 and the printing slides 243, and a slotted guide plate 248 is provided for receiving the upper ends of the arms 243ª to support them laterally in proper position, the forward and rear ends of said plate being supported by the supporting block 247 and the vertical guide plate 249 respectively. The guide plate 249 is provided at its ends with bent ears 249ª just inside of the side plates 121 and 128 of the machine, which ears are provided with holes for receiving the rod 101 which rod serves to support the guide plate 249 and thus the guide plate 248 in the position indicated by Fig. 10. The guide plate 249 is provided with slots for receiving the operating slides to maintain them in proper lateral position in the machine.

As more clearly shown in Fig. 6, the slots thus formed in the supporting block 247 for receiving the printing slides 243 are wider at their ends than at their middle portion to prevent binding between the walls of the slots and the slides should the slides not be perfectly aligned with the slots. As shown in this figure, the printing characters 246 for printing the dollars amount of any set-up are close together, so that there is no opportunity to insert other characters between the several orders of characters of the dollars amount and the characters 246ª for printing the number of cents involved in any set-up are separated from the characters for printing any desired dollars amount a sufficient amount to permit the insertion between the dollars and cents of a fixed printing character 250 which is rigidly secured to the under surface of the supporting block 247 and preferably carries the letters of the word "and". The printing characters 246ª of the two orders of units involved in printing the number of cents of any desired amount are close together for the same reason referred to in connection with the printing characters of the dollars amount. A second fixed printing block 251 is secured to the under surface of the supporting block 247 in the printing line on the other side of the printing characters printing the number of cents and in such position that there is no opportunity to insert other characters between the characters expressing the number of cents and the characters carried by the printing block 251. The printing block 251 preferably carries letters indicating cents, as for example the letters "cts." A third printing block 252 is supported upon the under surface of the printing block 247 and carries printing characters in the printing line, but this block 252 is movable longitudinally of the printing line an amount determined by the set-up amount. The block 252 as shown in Fig. 20 is provided with a shallow tongue 252ª which engages a corresponding groove in the under surface of the supporting block 247 and the printing block 252 is held with its tongue in engagement with said groove by a supporting rod 253 extending into the printing block 252 and supported at its outer end by a bracket 254 carried by the end of the supporting block 247 as shown in Fig. 3. The rod 253 is a sliding fit in the block 252, which block carries on its rear surface a rack 255 engaging a gear segment 256 pivotally supported at 257 from a bracket 258 carried by the supporting block 247. The segment 256 is provided with an arm 256ª from which a pin 259 projects upwardly to engage a slot 260ª formed through the inner end of the lever 260 which lever is pivotally supported at 261 upon a bracket 262 carried by the side plate 128. The outer end of the lever 260 is pivotally connected at 262' with the forward end of a connecting link 263 which, as shown in Fig. 2, is provided near its rear end with a slot 263$^a$ extending therethrough to receive a pin 264 projecting laterally from the lower end of the arm 234$^b$ of the lever 234. The end of pin 264 is connected with the rear end of the link 263 by a spring 265. As a result of the construction described when the lever 234 is operated during the first part of each operating cycle of the operating mechanism the link 263, the lever 260 and the segment 256 are operated to move the printing block 252 away from its normal position to clear such of the printing slides as may be moved to printing position subsequently, and this motion of the printing block 252 continues until the printing block is stopped, after which, continued motion of the lever 234 is permitted by the spring connection 265 between it and the end of the link 263. The printing block 252 constituted a value-limiting device for the amount printed on the check by printing desired characters immediately to the left of the highest significant figure printed by the printing slides, and I find it convenient to provide this printing block with the characters "Pay $" although it will be understood that any other desired characters may be employed. Furthermore it is not necessary that the printing block or the printing blocks 251 and 252 should be provided with the particular printing characters described, since the characters on the printing blocks 250, 251 and 252 may be selected to suit any particular requirements, it being only necessary that the characters carried by these printing blocks shall in connection with the numerical indications printed by the printing slides give a complete indication of the desired amount to be printed upon the check corresponding to the keyboard set-up without the possibility of introducing other characters in the printed amount after it is printed upon a check either above or below the highest printed amount or between the dollars and cents printed amounts in a manner to alter the value printed upon the check.

The printing block 252 normally occupies a position permitting the units printing slide 246 involved in printing any desired amount in dollars to move to its printing position and preventing any of the printing slides of higher order being moved to their printing position. This provides that for any particular set-up involving only a certain amount in cents, as for example 5¢, the resulting printed amount on a check would appear as follows "Pay$0and05cts." When it is desired to print an amount involving tens of dollars or a larger amount the printing block 252 is moved by the operation of the link 263 along the printing line from its normal position a sufficient amount to just clear the printing slide of highest order to be subsequently moved to printing position to print the desired amount and is prevented from further movement along the printing line as follows: The printing block 252 is provided with a stop lug 252$^b$ in the path of which the stops 266 and 267 rest, the stops 266 being movable and pivotally supported by the supporting block 247 but the stop 267 is incapable of movement from the path of the stop lug 252$^b$ since, when said stop lug is in engagement with the stop 267 the printing block 252 just clears the printing characters 246 of highest order.

As more clearly shown in Figs. 16, 18, 19 and 20, the stops 266 which are in ordered arrangement are provided above their supporting pivot rod 268 with bent extensions 266$^a$ lying in the paths of the pins 269 extending laterally from the retaining members 46 of the keyboard mechanism, which pins, as shown in Fig. 10, lie in front of the upper ends of said extensions 266$^a$, and extend through the off-set portions 45 of the keybar supports 40 to permit said engagement. Springs 270 extending between the extensions 266$^a$ and arm 271 carried by the supporting block 247 normally hold the stops 266 in the path of the stop lug 252$^b$. Interlocking pins 272 are carried by the stops 266 between each adjacent pair of said stops so that the operation of any one of the stops to move it out of the path of the stop lug 252$^b$ also moves the other stops 266 of lower order from said path without moving therefrom the stops of higher order.

As a result of the construction described, when a key of any particular order higher than units dollars is actuated the corresponding stop 266 is moved from the path of the stop lug 252$^b$ which also moves from said path the corresponding stops of lower order, and the printing block 252 is therefore moved during the first part of the cycle of operation of the operating mechanism into engagement with the stop 266 of next higher order to the one actuated by the keyboard mechanism, which places the printing block 252 in a position to just clear the printing slide 243 corresponding to the order of the key actuated. In practice the printing block 252 is normally in the path of the units dollars printing slide a certain amount to clear the stop lug 252$^b$ from the stop 266 of lowest order to permit the same to return to its normal position after having been actuated.

As shown in Figs. 8 and 10, a platen 273 is supported below the printing line of the check-writing mechanism by a housing 274 pivotally supported near the front of the machine upon a transverse rod 275 carried by posts 276 extending upwardly from the base 277 of the machine. The housing 274 is pivotally connected at each of its ends at 278 with a link 279, the other end of which is pivotally connected at 280 to the upper end of a second link 281 the lower end of which is pivotally supported at 282 by a bracket 283 carried by the base 277 of the machine. The pivotal connection 280 between the links 279 and 281 carries a roller 284 resting upon one end of the cam 285 mounted upon and rigidly secured to the cam shaft 286 supported in brackets 287 extending upwardly from the base 277 of the machine. The cam shaft 286 also rigidly carries an operating crank 288 the upper end of which is pivotally connected at 289 with the link 290 the other end of which is connected at 291 with the upper end of a plate 292 the lower end of which is pivotally supported at 293 from the base of the machine. The plate 292 carries a movable cam 294 which is pivotally secured to said plate at 295 and said cam 294 carries two pins 296 and 297 extending laterally from said cam away from the observer for the relation of parts shown in Fig. 8. The crank 288 and the parts connected therewith lie adjacent to the left hand side of the machine just inside of the side plate 128 thus bringing the pins 296 and 297 below the enlarged foot 298$^a$ of the key 298 used to throw the movable cam 294 into position to operate the platen when desired. The depression of the key 298 by engagement first with the pin 296 and then with the pin 297 rotates the movable cam 294 on the supporting plate 292 until it occupies the position shown in Fig. 10 in which position it is held against the action of the spring 299 tending to return it to the position shown in Fig. 8, by the engagement of the shoulder 298$^b$ formed near the upper end of the key 298 engaging the inner side of the flanged plate 300 of the key board mechanism shown in Fig. 3. A spring 301 shown in Figs. 8 and 10 is provided for moving the shoulder 298$^b$ into the engaging position referred to when the key 298 is depressed.

With the movable cam 294 in its depressed position, when the operating mechanism is actuated to rotate the cam 225, during the latter part of the forward motion of the operating handle, the roller 302 carried by said cam operates the cam 294 when the stop 303 is in position to permit the roller to enter the slot 303$^a$ formed in said stop. Continued motion of the operating handle in a forward direction moves the cam and its supporting plate forwardly of the machine thus operating the cam shaft 286 through the connections above described and moving the rollers 284 towards the front end of the machine, thus lifting the rear edge of the platen housing and moving the platen towards the printing line. Each pair of links 279 and 281 form a toggle connection between the base and the platen housing and a spring 304 is provided upon the rod 278 tending to move the links to the position shown in Fig. 8 when the cam 285 is in the position shown in said figure.

The proportion of the parts is such that when the cam 285 is rotated sufficiently to bring the roller 284 upon its circular delay surface the platen has not yet been moved into engagement with the printing characters in the printing line, but the housing, on the other hand, has completed its upward motion. To reduce the amount of pressure required upon the operating handle to print the check and to complete the necessary motion of the platen, the latter is divided into a plurality of elements as shown in Fig. 7, each having its individual sliding support in the platen housing 274 and each provided with an operating bell crank lever 305 pivotally supported upon the rod 278. Between the upper end of each bell crank lever 305 and the lower end of the corresponding platen element a curved spring 306 made from flat sheet metal is disposed and the other end of each of said levers 305 is provided with a roller 307. The rollers 307 are substantially in line with each other transversely of the machine and engage the edge of the cylindrical portion of the cam 285 which is cut away to form a series of steps as indicated at 285$^a$ in Fig. 7, as a result of which, when the cam 285 is further operated after the rollers 284 rest upon the delay surface of said cam, the levers 305 are actuated one after another by the stepped surface 285$^a$, thus bringing the platen elements one after another forcibly into engagement with the printing characters in the printing line above them. Just before each platen element bottoms against its corresponding printing character the corresponding spring 306 yields somewhat to permit the corresponding lever 305 to complete its operation after which the corresponding roller 307 passes upon the circular delay surface of the cam 285 and the next lever 305 is similarly operated, and so on for the entire series of levers and platen elements. The upward motion of the platen elements relatively to the platen housing is opposed by springs 308 carried by the platen housing, one or more of said springs being provided for each platen element, which springs serve to return the platen elements to their normal or lower position relatively to said housing when the cam 285 is moved in the reverse direction to release the levers 305. The springs 306 thus constitute a means for producing a uniform impression upon the check and provide for proper operation of the platen regardless of slight inaccuracies of workmanship that may be present in the printing slides or the platen operating train. When the operating handle is operated in its backward direction to move the roller 302 away from the cam 294 a spring 309 connecting the crank 288 with a post 310 extending upward from the base of the machine moves the cam shaft 286 and parts connected therewith to their normal position.

The printing characters carried by the printing slides 243 and the platen elements co-operating therewith are preferably corrugated so that they tear or shred to a certain extent the fibre of the check being printed to make it difficult to alter the value of the amount printed upon the check and to further increase this difficulty the printing characters in the printing line are inked before the printing operation as follows: As more clearly shown in Fig. 10 an inking pad 311 is supported upon a plate 311$^a$ so that the upper surface of the ink pad is in the printing line and in engagement with the printing faces of the printing characters, which during their motion to set-up position move across the upper surface of said ink pad. The arm 312 is provided with a cam slot 313 through which the rod 275 extends to in part support said arm and ink pad. The arms 312 and 312$^a$ extending from the plate 311$^a$ are pivotally connected at 314 with the upper ends of crank arms 315 rigidly secured to a rock shaft 316, the cam slot 313 being so conformed that when the shaft 316 and arms 315 rigidly carried thereby are in the position shown in Fig. 10, the ink pad 311 occupies its inking position as shown in said figure, and when the shaft 316 and the arms 315 are rotated to the position shown in Fig. 8 the ink pad is moved to a position below and clearing the mechanism employed to receive and support the check being printed, which position of the ink pad is also shown in Fig. 8.

A carrier 317 is provided for the check which carrier may be moved into and from the machine through slots 318 provided in the side plates 121 and 128. The carrier has secured to each of its side edges downwardly extending racks 319 and 320 engaging gears 321 and 322 respectively which are rigidly secured to a cross shaft 323. The racks 319 and 320 also rest respectively on other gears 324 and 325, which are pivotally mounted inside of the side plates 128 and 121 respectively, somewhat nearer the front of the machine than the gears 321 and 322. The gears mentioned serve to support the check carrier and the shaft 323 provides that both ends of the carrier shall move equally in moving a check to printing position and withdrawing the check from the machine. The racks 319 and 321 have longitudinal grooves formed in their outer surfaces engaged by lugs 326 carried by the side walls of the machine and projecting into said grooves as shown in Fig. 3 for holding the racks in engagement with the gears. As shown in Fig. 25, a stop screw 327 is provided in the groove formed in the rack 319 which, by engagement with the corresponding lug 326, prevents the removal of the check carrier from the machine.

As more clearly shown in Fig. 25, the check carrier 317 is provided with a handle 328 for moving the carrier into and from the machine, the check to be printed being inserted below an upper shield 329 of thin sheet metal which is located over the body portion of the check carrier. The shield has cut therein an opening 330 to receive the printing characters in the printing line and a second clearance opening 331 is formed in the body portion of the check carrier to permit the platen elements to engage the under side of the check being printed.

As shown in Figs. 8 and 10 a hook stop 332 is pivotally mounted upon a stud 333 projecting inwardly from the side plate 121 which side plate is removed in Fig. 8, and this stop 332 is provided with a downwardly extending arm 332$^a$ having formed therein a slot 334 for engaging a pin 335 carried by the outer end of an arm 336 rigidly secured to the shaft 316. As a result of the construction described when the shaft 316 is rotated to move the ink pad from the position indicated in Fig. 10 to the position shown in Fig. 8 the hook stop 332 is moved from its stopping position in the path of the check carrier 317 to its lower position shown in Fig. 8 clearing the under side of the check carrier, for which position the check carrier may be moved into the machine. This motion of the check carrier into the machine causes engagement between the inner end of the rack 319 and a lug 303$^b$ carried by the stop 303, thus moving the stop when the check carrier is in its innermost position to a position permitting the roller 302 to enter the slot 303$^a$ in said stop. When the check carrier 317 is not in its innermost position the stop 303 is moved by the spring 337 until the lug 303$^c$ carried by said stop engages the side flange of the base for which position the end of the stop is in the path of the roller 302 and prevents further motion thereof.

As shown in Figs. 1 and 2 the shaft 316 is supported by brackets 338 carried by the base and, as shown in Fig. 1, the right hand end of said shaft carries a crank arm 339 which is rigidly secured thereto and which is connected by a link 340 with the lower end of a lever 341 pivotally connected at 342 to the side plate 121 of the machine. The lever 341 carries a roller 343 which is pivotally mounted thereon in the path of the cam surface 112$^a$ of the operating cam carried by the shaft 113. A spring 344 extending between the link 340 and a pin 345 carried by the side plate 121 moves the link 340 and the parts carried thereby to their position indicated in Figs. 1 and 10 when the roller 343 is not in engagement with the cam 112. A stop pin 346 carried by the side plate 121 engages the cam 112 to limit its motion in both directions.

As a result of the construction described it will appear that forward motion of the operating handle 114 first rotates the shaft 88 to accomplish the several functions above described as controlled by said shaft, after which the operating slides and the printing slides of the check-writing mechanism, are moved to their position corresponding to the set-up on the keyboard, and at the same time the listing slides are permitted to move to a corresponding position under the influence of their actuating springs. If at this time or prior to the operation of the operating handle it is attempted to move the check carrier into printing position such motion is prevented by the stop hook 332 which occupies the position indicated in Fig. 10. Continued operation of the operating handle 114 forwardly operates the lever 341 which in turn rocks the shaft 316 thus moving the ink pad from its inking position and removing the stop hook 332 from the position shown in Fig. 10 to the position shown in Fig. 8, after which continued motion of the operating handle brings the roller 302 into engagement with the stop 303 preventing further motion of the operating handle in a forward direction until the check carrier is moved into printing position which removes the stop 303 from the path of the roller 302 and permits the completion of the forward stroke of the operating handle, the remaining portion of said forward motion serving to actuate the platen housing and platen elements to print the check and at substantially the same time the platen 209 of the listing mechanism to print the amount on the record strip 199.

If it is not desired to print a check during the operation of the machine, or in other words it is desired to operate the remaining mechanism and in effect omit the check-writing as a feature of the operation, the key 298 is permitted to occupy its raised position and the check carrier is moved to its inner position at the time that the position of the operating handle permits this to be done. Continued motion of the operating handle thereafter performs no function in connection with printing the check since the operating train between the platen housing and its elements and the roller 302 is interrupted by the movable cam 294 being in its upper position but said continued operation of the operating handle is permitted since the stop 303 is out of the path of the roller 302 on account of its engagement with the check carrier. During the inoperative period of the check writing mechanism the ink pad is retained in its lower position by the engagement of the hook stop 332 with the under side of the check carrier.

As a result of the construction described above it will appear that if desired the entire listing mechanism may be removed from the machine without interfering in any manner with the operation of the adding mechanism and the check-writing mechanism. It will further appear that the adding mechanism may be removed as a unit from the machine without interfering with the operation of the listing mechanism and the check-writing mechanism, or if desired any one of the three mechanisms may be operated alone from the operating mechanism of the machine, but that in any event the keyboard mechanism and the operating slides, together with the operating devices directly connected therewith, are an essential part of the structure serving to control the operation of any of the three operating mechanisms which may be employed.

It will also appear that it is not necessary in connection with many features of the construction to use the exact arrangements employed, as for example the operating levers 104 and 107 need not be formed as bell crank levers but may be separate levers, or may be replaced by any device for connecting the rock shaft 106 with the operating slides so that said slides are operated by said shaft through a yielding driving mechanism so that said operating slides may have different amounts of motion for the same amount of motion of the rock shaft.

The check carrier 317 may be moved, if desired, to its printing position automatically when the hook stop 332 is moved from its stopping position by means of a spiral spring 347 shown in Fig. 2 connected at one end with the projecting end of the shaft 323 and at the other end with the side plate 128 of the machine, the spring being so adjusted that it has sufficient tension to rotate the shaft 323 and move the check carrier from its outermost position to its printing position when the hook stop is depressed. With this arrangement all that is necessary in printing a check is to place the check in proper position in the carrier after the same has been drawn to its outermost position by the handle 328. When the handle 114 is moved forwardly after the check has been placed in the check carrier, the forward motion of the handle may proceed uninterruptedly to the end of its stroke, since the stop 303 is moved from its stopping position by the backward motion of the check carrier immediately after the hook stop 332 has been depressed in the manner above described.

A combined adding, check-writing and listing machine as above described is useful for many purposes, as for example in taking care of pay rolls where payment is made by check, for with this machine the checks can be written and listed and the total amount of the checks can be determined at once from the adding mechanism. Or, again, the machine may be used for keeping track of the checking account of a business, and the adding mechanism affords an indication at any time of the total amount paid out and the listing mechanism preserves a record of the amounts of the checks written or printed.

While I have used the term "printed" in connection with the record made by the listing mechanism and the check-writing mechanism to designate the operation of bringing the check or record strip into engagement with the set up characters, I do not limit myself to any exact form of printing devices as I include within the meaning of the term any devices that will emboss or imprint or in any way make a record upon a check or the record strip of the desired amount.

While I have shown my invention in the particular embodiment above described, it will be understood that I do not limit myself to the mechanical construction disclosed, as I may employ any equivalents thereof known in the art at the time of filing the appended claims, without departing from the spirit of my invention.

What I claim is:

1. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, and devices carried by said rock shaft and operated by said cam.

2. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, said first and second sets of levers being spring connected to said rock shaft and free to rotate thereon to permit different amounts of motion of said operating slides and said listing slides for the same amount of motion of said rock shaft, and a spring for returning said shaft to its normal position.

3. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, said first and second sets of levers being spring connected to said rock shaft and free to rotate thereon to permit different amounts of motion of said operating slides and said listing slides for the same amount of motion of said rock shaft, and a spring for returning said shaft to its normal position, said first and second sets of levers being respectively connected together in the form of bell crank levers.

4. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, said first and second sets of levers being spring connected to said rock shaft and free to rotate thereon to permit different amounts of motion of said operating slides and said listing slides for the same amount of motion of said rock shaft, a spring for returning said shaft to its normal position, and a third set of levers on the rock shaft for returning the operating slides to normal position.

5. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, and a third set of levers on the rock shaft for returning the operating slides to normal position.

6. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, and a yielding backing affording a lateral support for each listing slide at its printing position.

7. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a second cam carried by the operating shaft, and connections between said cam and said platen support for moving said platen against the listing slides by operation of said handle.

8. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a second cam carried by the operating shaft, connections between said cam and said platen support for moving said platen against the listing slides by operation of said handle, and a yielding element in the operating connections between said second cam and the platen support.

9. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a second cam carried by the operating shaft. connections between said cam and said platen support for moving said platen against the listing slides by operation of said handle, a yielding element in the operating connections between said second cam and the platen support, and a yielding backing affording a lateral support for each listing slide at its printing position.

10. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a ratchet wheel carried by said platen, an operating pawl co-operating with said ratchet wheel, and a fixed pivot for said pawl carried by the support for said listing slides.

11. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a printing block in the printing line of said printing slides and moving longitudinally of said line, said block being normally in the path of said printing slides, a second cam carried by said operating shaft, and actuating mechanism between said block and said cam for moving said block along the printing line to a position just clearing the highest ordered printing slide to be actuated by continued operation of said handle.

12. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a printing block in the printing line of said printing slides and moving longitudinally of said line, said block being normally in the path of said printing slides, a second cam carried by said operating shaft, actuating mechanism between said block and said cam for moving said block along the printing line to a position just clearing the highest ordered printing slide to be actuated by continued operation of said handle, said support for the printing slides having a longitudinal groove for receiving said printing block, and a supporting member for holding said block in position in said groove.

13. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a printing block in the printing line of said printing slides and moving longitudinally of said line, said block being normally in the path of said printing slides, a second cam carried by said operating shaft, actuating mechanism between said block and said cam for moving said block along the printing line to a position just clearing the highest ordered printing slide to be actuated by continued operation of said handle, a longitudinal groove in the support for said printing slides for affording lateral support for said printing block, and a rod supported from its end parallel with said groove for holding said block in said groove and permitting longitudinal motion thereof in the groove, said block having a longitudinal hole therein for receiving said rod.

14. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a third set of levers on the rock shaft for returning the operating slides to normal position, a second platen, a second cam on the operating shaft, and actuating connections between said second cam and said second platen for moving the latter against the printing slides by rotation of said second cam after previous operation of said handle has placed the printing slides in printing position.

15. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a third set of levers on the rock shaft for returning the operating slides to normal position, a second platen, a second cam on the operating shaft, and actuating connections between said second cam and said second platen for moving the latter against the printing slides by rotation of said second cam after previous operation of said handle has placed the printing slides in printing position, said second platen consisting of a plurality of elements, and said actuating connections comprising devices actuating said elements one after another.

16. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a second platen movable to engage said printing slides, a pivoted housing for said second platen, cam mechanism for moving said housing and platen towards said printing slides, a cam shaft for supporting said cam mechanism, said second platen consisting of a plurality of elements, a plurality of levers pivotally supported by the platen housing for actuating the platen elements, and a stepped cam carried by said cam shaft for successively operating said levers.

17. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a second platen movable to engage said printing slides, a pivoted housing for said second platen, cam mechanism for moving said housing and platen towards said printing slides, a cam shaft for supporting said cam mechanism, said second platen consisting of a plurality of elements, a plurality of levers pivotally supported by the platen housing for actuating the platen elements, a stepped cam carried by said cam shaft for successively operating said levers, and a yielding connection between each lever and its platen element.

18. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a third set of levers on the rock shaft for returning the operating slides to normal position, a second platen, a second cam on the operating shaft, actuating connections between said second cam and said second platen for moving the latter against the printing slides by rotation of said second cam after previous operation of said handle has placed the printing slides in printing position, said second platen consisting of a plurality of elements, and said actuating connections comprising devices actuating said elements one after another, a rocking member constituting a part of said actuating connections, a cam movably supported upon said rocking member, a setting key for moving said movable cam to operative position, and a member carried by said operating shaft for engaging said movable cam to operate the latter and thereby said actuating connections when said handle is operated.

19. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a second platen movable to engage said printing slides, a pivoted housing for said second platen, cam mechanism for moving said housing and said second platen towards said printing slides, a cam shaft for supporting said cam mechanism, said second platen consisting of a plurality of elements, a plurality of levers pivotally supported by the platen housing for actuating the platen elements, a stepped cam carried by said cam shaft for successively operating said levers, a yielding connection between each lever and its platen element, a rocking member constituting a part of said actuating connections, a cam movably supported upon said rocking member, a setting key for moving said movable cam to operative position, and a member carried by said operating shaft for engaging said movable cam to operate the latter and thereby said actuating connections when said handle is operated.

20. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a third set of levers on the rock shaft for returning the operating slides to normal position, a second platen, a second cam on the operating shaft, actuating connections between said second cam and said second platen for moving the latter against the printing slides by rotation of said second cam after previous operation of said handle has placed the printing slides in printing position, said second platen consisting of a plurality of elements, and said actuating connections comprising devices actuating said elements one after another, a rocking member constituting a part of said actuating connections, a cam movably supported upon said rocking member, a setting key for moving said movable cam to operative position, a member carried by said operating shaft for engaging said movable cam to operate the latter and thereby said actuating connections when said handle is operated, a stop for preventing rotation of the operating shaft to actuate said movable cam, a check carrier movable to and from printing position, and a device carried by said carrier for engaging said stop to move the same to releasing position when said carrier is in printing position.

21. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a second platen movable to engage said printing slides, a pivoted housing for said second platen, cam mechanism for moving said housing and said platen towards said printing slides, a cam shaft for supporting said cam mechanism, said second platen consisting of a plurality of elements, a plurality of levers pivotally supported by the platen housing for actuating the platen elements, a stepped cam carried by said cam shaft for successively operating said levers, a yielding connection between each lever and its platen element, a rocking member constituting a part of said actuating connections, a cam movably supported upon said rocking member, a setting key for moving said movable cam to operative position, a member carried by said operating shaft for engaging said movable cam to operate the latter and thereby said actuating connections when said handle is operated, a stop for preventing rotation of the operating shaft to actuate said movable cam, a check carrier movable to and from printing position, and a device carried by said carrier for engaging said stop to move the same to releasing position when said carrier is in printing position.

22. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a second platen, a movable support for said second platen, devices connecting said support with said operating shaft for moving said support and said second platen towards said printing slides by operation of said handle, an inking device, supports for said inking device for holding the same in the path of printing characters carried by the printing slides, and actuating connections between said inking device supports and said cam for moving said inking device from inking position after the printing slides have been moved to printing position and before the operation of said platen support.

23. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a second platen, a movable support for said second platen, devices connecting said support with said operating shaft for moving said support and said second platen towards said printing slides by operation of said handle, an inking device, supports for said inking device for holding the same in the path of printing characters carried by the printing slides, actuating connections between said inking device supports and said cam for moving said inking device from inking position after the printing slides have been moved to printing position and before the operation of said platen support, a check carrier movable to and from printing position relatively to the printing slides, a stop for said check carrier, and connections between said stop and the inking device supports placing said stop in position to prevent motion of said check carrier to printing position when said inking device is in its inking position.

24. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a keyboard having a plurality of series of keys in ordered arrangement, and stops carried by said keys for limiting the movement of said operating slides.

25. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, and a locking member for each series of keys for holding an actuated key and its stop in depressed position.

26. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, and a locking member for each series of keys for holding an actuated key and its stop in depressed position, the operation of each of said locking members by the depression of a key serving to release keys previously locked thereby.

27. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a zero stop for each series of keys normally in the path of the corresponding operating slide, and devices connecting each zero stop with the corresponding locking member whereby operation of a locking member by depression of a key removes the corresponding zero stop from the path of the corresponding operating slide.

28. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a releasing member for actuating all of said locking members to release the keys held in depressed condition thereby, a second cam carried by the operating shaft, and connections between said second cam and said releasing member for operating the latter at the end of the cycle of operation of the operating shaft.

29. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a releasing member for actuating all of said locking members to release the keys held in depressed condition thereby, a second cam carried by the operating shaft, connections between said second cam and said releasing member for operating the latter at the end of the cycle of operation of the operating shaft, and a device co-operating with said connections when actuated to disconnect said releasing member from said second cam to prevent operation of said releasing member.

30. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a releasing member for actuating all of said locking members to release the keys held in depressed condition thereby, a second cam carried by the operating shaft, connections between said second cam and said releasing member for operating the latter at the end of the cycle of operation of the operating shaft, a device co-operating with said connections when actuated to disconnect said releasing member from said second cam to prevent operation of said releasing member, a holding pawl maintaining said device in its operated condition, and a second device for moving said holding pawl to its releasing position and actuating said releasing member.

31. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a blank stop for each series of keys in the plane of the corresponding operating slide, means for holding the blank stops out of the paths of the corresponding operating slides, devices operated during the first part of the cycle of operation of the operating shaft for actuating said holding means to release the blank stops, and mechanism connected with said blank stops and co-operating with said locking members for preventing each of said blank stops moving into the path of the corresponding operating slide when the corresponding locking member is actuated to retain a depressed key.

32. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a blank stop for each series of keys in the plane of the corresponding operating slide, means for holding the blank stops out of the paths of the corresponding operating slides, devices operated during the first part of the cycle of operation of the operating shaft for actuating said holding means to release the blank stops, mechanism connected with said blank stops and co-operating with said locking members for preventing each of said blank stops moving into the path of the corresponding operating slides when the corresponding locking member is actuated to retain a depressed key, and co-operating devices between each blank stop and the blank stops of lower order for holding said blank stops of lower order out of the paths of the corresponding operating slides when said blank stop is held out of the path of its operating slide without interfering with the blank stops of higher order.

33. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a printing block in the printing line of the characters on said printing slides, mechanism for moving said printing block from the path of said printing slides from lower to higher order, ordered stops in the path of said printing block to limit its motion by said mechanism, and devices actuated by said locking members for removing the corresponding stops from the path of said printing block whereby the actuation of one of said locking members by the depression of a key removes the corresponding stop from the path of the printing block.

34. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, a first set of levers carried by said rock shaft for moving said operating slides, a second set of levers carried by said rock shaft for controlling the operation of said listing slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a printing block in the printing line of the characters on said printing slides, mechanism for moving said printing block from the path of said printing slides from lower to higher order, ordered stops in the path of said printing block to limit its motion by said mechanism, devices actuated by said locking members for removing the corresponding stops from the path of said printing block whereby the actuation of one of said locking members by the depression of a key removes the corresponding stop from the path of the printing block, and interlocking devices between said stops whereby the removal of one of said stops removes the stops of the lower order from the path of printing block.

35. In a check-writing machine, the combination of mechanism for recording an individual amount of operation upon a check, set-up mechanism for limiting an individual operation to a desired amount, an operating element, said recording mechanism comprising ordered printing elements and a movable corrugated platen, means for moving said printing elements to positions corresponding to a set-up during a first part of the operation of the operating element, devices operated during a second part of the operation of said operating element for moving said platen against said printing elements, said platen consisting of a plurality of elements individually operated, and a yielding element in the operating train of each platen element.

36. In a check-writing machine, the combination of mechanism for recording an individual amount of operation upon a check, set-up mechanism for limiting an individual operation to a desired amount, an operating element, said recording mechanism comprising ordered printing elements and a movable corrugated platen, means for moving said printing elements to positions corresponding to a set-up during a first part of the operation of the operating element, devices operated during a second part of the operation of said operating element for moving said platen against said printing elements, said platen consisting of a plurality of elements individually operated one after another, and a yielding element in the operating train of each platen element.

37. In a check-writing machine, the combination of mechanism for recording an individual amount of operation upon a check, set-up mechanism for limiting an individual operation to a desired amount, an operating element, said recording mechanism comprising ordered printing elements and a movable corrugated platen, means for moving said printing elements to positions corresponding to a set-up during a first part of the operation of the operating element, devices operated during a second part of the operation of said operating element for moving said platen against said printing elements, a value-limiting device in the printing line of said recording mechanism, said value-limiting device normally occupying a position in the path of said printing elements, and actuating devices between said value-limiting device and said operating element for moving said value-limiting device during the first part of the operation of the operating element an amount sufficient only to permit the highest ordered printing element of the set-up to move to printing position.

38. In a check-writing machine, the combination of mechanism for recording an individual amount of operation upon a check, set-up mechanism for limiting an individual operation to a desired amount, an operating element, said recording mechanism comprising ordered printing elements and a movable corrugated platen, means for moving said printing elements to positions corresponding to a set-up during a first part of the operation of the operating element, devices operated during a second part of the operation of said operating element for moving said platen against said printing elements, a value-limiting device in the printing line of said recording mechanism, said value-limiting device normally occupying a position in the path of said printing elements, actuating devices between said value-limiting device and said operating element for moving said value-limiting device during the first part of the operation of the operating element an amount sufficient only to permit the highest ordered printing element of the set-up to move to printing position, ordered stops in the path of said value-limiting device, and stop actuating devices between said stops and said set-up mechanism whereby actuating said set-up mechanism a desired amount operates the stop of the highest order of the amount set-up to remove it from the path of said value-limiting device.

39. In a check-writing machine, the combination of mechanism for recording an individual amount of operation upon a check, set-up mechanism for limiting an individual operation to a desired amount, an operating element, said recording mechanism comprising ordered printing elements and a movable corrugated platen, means for moving said printing elements to positions corresponding to a set-up during a first part of the operation of the operating element, devices operated during a second part of the operation of said operating element for moving said platen against said printing elements, a value-limiting device in the printing line of said recording mechanism, said value-limiting device normally occupying a position in the path of said printing elements, actuating devices between said value-limiting device and said operating element for moving said value-limiting device during the first part of the operation of the operating element an amount sufficient only to permit the highest ordered printing element of the set-up to move to printing position, ordered stops in the path of said value-limiting device, stop-actuating devices between said stops and said set-up mechanism whereby actuating said set-up mechanism a desired amount operates the stop of the highest order of the amount set up to remove it from the path of said value-limiting device, and interlocking devices between said stops by which the operation of a stop of one order also operates the stops of lower order to move the same from the path of the value-limiting device.

40. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, and devices carried by said rock shaft and operated by said cam.

41. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, said levers being spring connected to said rock shaft and free to rotate thereon to permit different amounts of motion of said operating slides for the same amount of motion of said rock shaft, and a spring for returning said shaft to its normal position.

42. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, said levers being spring connected to said rock shaft and free to rotate thereon to permit different amounts of motion of said operating slides for the same amount of motion of said rock shaft, a spring for returning said shaft to its normal position, and a second set of levers carried by said rock shaft for returning said operating slides to their normal position.

43. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a spring for returning said shaft to its normal position, and a second set of levers carried by said rock shaft for returning said operating slides to their normal position.

44. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a printing block in the printing line of said printing slides and movable longitudinally of said line, said block being normally in the path of said printing slides, a second cam carried by said operating shaft, and actuating mechanism between said block and said cam for moving said block along the printing line to a position just clearing the highest ordered printing slide to be actuated by continued operation of said handle.

45. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a printing block in the printing line of said printing slides and movable longitudinally of said line, said block being normally in the path of said printing slides, a second cam carried by said operating shaft, actuating mechanism between said block and said cam for moving said block along the printing line to a position just clearing the highest ordered printing slide to be actuated by continued operation of said handle, said support for the printing slides having a longitudinal groove for receiving said printing block, and a supporting member for holding said block in position in said groove.

46. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a printing block in the printing line of said printing slides and movable longitudinally of said line, said block being normally in the path of said printing slides, a second cam carried by said operating shaft, actuating mechanism between said block and said cam for moving said block along the printing line to a position just clearing the highest ordered printing slide to be actuated by continued operation of said handle, a longitudinal groove in the support for said printing slides for affording lateral support for said printing block, and a rod supported from its end parallel with said groove for holding said block in said groove and permitting longitudinal motion thereof in the groove, said block having a longitudinal hole therein for receiving said rod.

47. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a platen, a second cam on the operating shaft, and actuating connections between said second cam and said platen for moving the latter against the printing slides by rotation of said second cam after previous operation of said handle has placed the printing slides in printing position.

48. In a check writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a platen, a second cam on the operating shaft, actuating connections between said second cam and said platen for moving the latter against the printing slides by rotation of said second cam after previous operation of said handle has placed the printing slides in printing position, said platen consisting of a plurality of elements, and said actuating connections comprising devices actuating said elements one after another.

49. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a platen movable to engage said printing slides, a pivoted housing for said platen, cam mechanism for moving said housing and platen towards said printing slides, a cam shaft for actuating said cam mechanism, said platen consisting of a plurality of elements, a plurality of levers pivotally supported by the platen housing for actuating the platen elements, and a stepped cam carried by said cam shaft for successively operating said levers.

50. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a platen movable to engage said printing slides, a pivoted housing for said platen, cam mechanism for moving said housing and platen towards said printing slides, a cam shaft for actuating said cam mechanism, said platen consisting of a plurality of elements, a plurality of levers pivotally supported by the platen housing for actuating the platen elements, a stepped cam carried by said cam shaft for successively operating said levers, and a yielding connection between each lever and its platen element.

51. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a platen, a movable support for said platen, devices connecting said support with said operating shaft for moving said support and said platen towards said printing slides by operation of said handle, an inking device, supports for said inking device for holding the same in the path of printing characters carried by the printing slides, and actuating connections between said inking device supports and said cam for moving said inking device from inking position after the printing slides have been moved to printing position and before the operation of said platen support.

52. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a platen, a movable support for said platen, devices connecting said support with said operating shaft for moving said support and said platen towards said printing slides by operation of said handle, an inking device, supports for said inking device for holding the same in the path of printing characters carried by the printing slides, actuating connections between said inking device supports and said cam for moving said inking device from inking position after the printing slides have been moved to printing position and before the operation of said platen support, a check carrier movable to and from printing position relatively to the printing slides, a stop for said check carrier, and connections between said stop and said inking device supports placing said stop in position to prevent motion of said carrier to printing position when said inking device is in inking position.

53. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a keyboard having a plurality of series of keys in ordered arrangement, and stops carried by said keys for limiting the movement of said operating slides.

54. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, and a locking member for each series of keys for holding an actuated key and its stop in depressed position.

55. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, and a locking member for each series of keys for holding an actuated key and its stop in depressed position, the operation of each of said locking members by the depression of a key serving to release keys previously locked thereby.

56. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a zero stop for each series of keys normally in the path of the corresponding operating slide, and devices connecting each zero stop with the corresponding locking member whereby operation of a locking member by depression of a key removes the corresponding zero stop from the path of the corresponding operating slide.

57. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a releasing member for actuating all of said locking members to release the keys held in depressed condition thereby, a second cam carried by the operating shaft, and connections between said second cam and said releasing member for operating the latter at the end of the cycle of operation of the operating shaft.

58. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a releasing member for actuating all of said locking members to release the keys held in depressed condition thereby, a second cam carried by the operating shaft, connections between said second cam and said releasing member for operating the latter at the end of the cycle of operation of the operating shaft, and a device co-operating with said connections when actuated to disconnect said releasing member from said second cam to prevent operation of said releasing member.

59. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a releasing member for actuating all of said locking members to release the keys held in depressed condition thereby, a second cam carried by the operating shaft, connections between said second cam and said releasing member for operating the latter at the end of the cycle of operation of the operating shaft, a device co-operating with said connections when actuated to disconnect said releasing member from said second cam to prevent operation of said releasing member, a holding pawl maintaining said device in its operated condition, and a second device for moving said holding pawl to its releasing position and actuating said releasing member.

60. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a keybord having a plurality of series of keys in ordered arrangement, stops carried by said keys for limiting the movement of said operating slides, a locking member for each series of keys for holding an actuated key and its stop in depressed position, a blank stop for each series of keys in the plane of the corresponding operating slide, means for holding the blank stops out of the paths of the corresponding operating slides, devices operated during the first part of the cycle of operation of the operating shaft for actuating said holding means to release the blank stops, and mechanism connected with said blank stops and co-operating with said locking members for preventing each of said blank stops moving into the path of the corresponding operating slide when the corresponding locking member is actuated to retain a depressed key.

61. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a blank stop for each series of keys in the plane of the corresponding operating slide, means for holding the blank stops out of the paths of the corresponding operating slides, devices operated during the first part of the cycle of operation of the operating shaft for actuating said holding means to release the blank stops, mechanism connected with said blank stops and co-operating with said locking members for preventing each of said blank stops moving into the path of the corresponding operating slide when the corresponding locking member is actuated to retain a depressed key, and co-operating devices between each blank stop and the blank stops of lower order for holding said blank stops of lower order out of the paths of the corresponding operating slides when said blank stop is held out of the path of its operating slide without interfering with the blank stops of higher order.

62. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a printing block in the printing line of the characters on said printing slides, mechanism for moving said printing block from the path of said printing slides from lower to higher order, ordered stops in the path of said printing block to limit its motion by said mechanism, and devices actuated by said locking members for removing the corresponding stops from the path of said printing block whereby the actuation of one of said locking members by the depression of a key removes the corresponding stop from the path of the printing block.

63. In a check-writing machine, the combination of printing slides for recording a desired amount upon a check, a support for holding said printing slides in ordered arrangement, an operating slide connected with each of said printing slides, a rock shaft, a set of levers carried by said rock shaft for moving said operating slides, an operating shaft, a handle carried by said operating shaft, a cam carried by said operating shaft, devices carried by said rock shaft and operated by said cam, a keyboard having a plurality of series of keys in ordered arrangement, stops carried by said keys for limiting the movement of said operating slides, a locking member for each series of keys for holding an actuated key and its stop in depressed position, a printing block in the printing line of the characters on said printing slides, mechanism for moving said printing block from the path of said printing slides from lower to higher order, ordered stops in the path of said printing block to limit its motion by said mechanism, devices actuated by said locking members for removing the corresponding stops from the path of said printing block whereby the actuation of one of said locking members by the depression of a key removes the corresponding stop from the path of the printing block, and interlocking devices between said stops whereby the removal of one of said stops removes the stops of lower order from the path of the printing block.

64. In a listing and check-writing machine, the combination of listing slides carrying printing devices, a support for holding said slides in ordered arrangement, a roller platen for printing a record from said listing slides, a movable support for said platen, printing slides for recording a desired amount upon a check, a support for holding said printing slides in ordered arrangement, an operating slide connected with each of said printing slides, a rock shaft, devices carried by said rock shaft for moving said operating slides and controlling the operation of said listing slides, an operating shaft, a handle carried by said operating shaft, a cam carried by said operating shaft, and devices carried by said rock shaft and operated by said cam.

65. In a check-writing machine, the combination of printing slides for recording a desired amount upon a check, a support for holding said printing slides in ordered arrangement, an operating slide connected with each of said printing slides, a rock shaft, devices carried by said rock shaft for moving said operating slides, an operating shaft, a handle carried by said operating shaft, a cam carried by said operating shaft, and devices carried by said rock shaft and operated by said cam.

66. In a check-writing machine, the combination of mechanism for recording an individual amount of operation upon a check, set-up mechanism for limiting an individual operation to a desired amount, an operating element, said recording mechanism comprising ordered printing elements and a movable corrugated platen, means for moving said printing elements to positions corresponding to a set-up during a first part of the operation of the operating element, devices operated during a second part of the operation of said operating element for moving said platen against said printing elements, a value-limiting device in the printing line of said check-writing mechanism, said value-limiting device normally occupying a position in the path of said printing elements, actuating devices between said value-limiting device and said operating element for moving said value-limiting device during the first part of the operation of the operating element an amount sufficient only to permit the highest ordered printing element of the set-up to move to printing position, ordered stops in the path of said value-limiting device, stop-actuating devices between said stops and said set-up mechanism whereby actuating said set-up mechanism a desired amount operates the stop of the highest order of the amount set up to remove it from the path of said value-limiting device, and a yielding element in the actuating train between said value-limiting device and said operating element.

67. In a machine of the class described, the combination of ordered devices each having a series of digits thereon, and a common operating mechanism for said devices comprising an operating slide connected with each of said devices, a rock shaft, a set of levers carried by said rock shaft for moving said operating slides, an operating shaft, a handle carried by said operating shaft, a cam carried by said operating shaft, and devices carried by said rock shaft and operated by said cam.

68. In a machine of the class described, the combination of ordered devices each having a series of digits thereon, and a common operating mechanism for said devices comprising an operating slide connected with each of said devices, a rock shaft, a set of levers carried by said rock shaft for moving said operating slides, an operating shaft, a handle carried by said operating shaft, a cam carried by said operating shaft, and devices carried by said rock shaft and operated by said cam, said levers being spring connected to said rock shaft and free to rotate thereon to permit different amounts of motion of said operating slides for the same amount of motion of said rock shaft.

69. In a machine of the class described, the combination of ordered devices each having a series of digits thereon, and a common operating mechanism for said devices comprising an operating slide connected with each of said devices, a rock shaft, a set of levers carried by said rock shaft for moving said operating slides, an operating shaft, a handle carried by said operating shaft, a cam carried by said operating shaft, devices carried by said rock shaft and operated by said cam, said levers being spring connected to said rock shaft and free to rotate thereon to permit different amounts of motion of said operating slides for the same amount of motion of said rock shaft, and a second set of levers carried by said rock shaft for returning said operating slides to their normal position.

70. In a machine of the class described, the combination of ordered devices each having a series of digits thereon, and a common operating mechanism for said devices comprising an operating slide connected with each of said devices, a rock shaft, a set of levers carried by said rock shaft for moving said operating slides, an operating shaft a handle carried by said operating shaft, a cam carried by said operating shaft, devices carried by said rock shaft and operated by said cam, and a second set of levers carried by said rock shaft for returning said operating slides to their normal position.

71. In a machine of the class described, the combination of ordered slides each carrying a series of characters, means for moving said slides, a keyboard having a plurality of series of keys in ordered arrangement, and stops carried by said keys for limiting the movement of said slides.

72. In a machine of the class described, the combination of ordered slides each carrying a series of characters, means for moving said slides, a keyboard having a plurality of series of keys in ordered arrangement, stops carried by said keys for limiting the movement of said slides, and a locking member for each series of keys for holding an actuated key and its stop in operated position.

73. In a machine of the class described, the combination of ordered slides each carrying a series of characters, means for moving said slides, a keyboard having a plurality of series of keys in ordered arrangement, stops carried by said keys for limiting the movement of said slides, and a locking member for each series of keys for holding an actuated key and its stop in operated position, the operation of each of said locking members by the depression of a key serving to release keys previously locked thereby.

74. In a machine of the class described, the combination of ordered slides each carrying a series of characters, means for moving said slides, a keyboard having a plurality of series of keys in ordered arrangement, stops carried by said keys for limiting the movement of said slides, a locking member for each series of keys for holding an actuated key and its stop in operated position, a zero stop for each series of keys for the corresponding slide, and devices connecting each zero stop with the corresponding locking member whereby operation of a locking member by depression of a key removes the corresponding zero stop.

75. In a machine of the class described, the combination of ordered slides each carrying a series of characters, means for moving said slides, a keyboard having a plurality of series of keys in ordered arrangement, stops carried by said keys for limiting the movement of said slides, a locking member for each series of keys for holding an actuated key and its stop in operated position, a releasing member for actuating all of said locking members to release the keys held in depressed condition thereby, a cam actuated by said moving means, and connections between said cam and said releasing member for operating the latter at the end of the cycle of operation of the moving means.

76. In a machine of the class described, the combination of ordered slides each carrying a series of characters, means for moving said slides, a keyboard having a plurality of series of keys in ordered arrangement, stops carried by said keys for limiting the movement of said slides, a locking member for each series of keys for holding an actuated key and its stop in operated position, a releasing member for actuating all of said locking members to release the keys held in depressed condition thereby, a cam actuated by said moving means, connections between said cam and said releasing member for operating the latter at the end of the cycle of operation of the moving means, and a device co-operating with said connections when actuated to disconnect said releasing member from said cam to prevent operation of said releasing member.

77. In a machine of the class described, the combination of ordered slides each carrying a series of characters, means for moving said slides, a key board having a plural-